(12) United States Patent (10) Patent No.: US 7,816,709 B2
Balzano et al. (45) Date of Patent: *Oct. 19, 2010

(54) SINGLE-WALLED CARBON NANOTUBE-CERAMIC COMPOSITES AND METHODS OF USE

(75) Inventors: Leandro Balzano, Norman, OK (US); Daniel E. Resasco, Norman, OK (US)

(73) Assignee: The Board of Regents of The University of Oklahoma, Norman, OK (US)

( * ) Notice: Subject to any disclaimer, the term of this patent is extended or adjusted under 35 U.S.C. 154(b) by 1711 days.

This patent is subject to a terminal disclaimer.

(21) Appl. No.: 10/834,351

(22) Filed: Apr. 28, 2004

(65) Prior Publication Data

US 2010/0240529 A1 Sep. 23, 2010

Related U.S. Application Data

(63) Continuation-in-part of application No. 10/423,687, filed on Apr. 25, 2003, now Pat. No. 6,994,907, which is a continuation of application No. 09/998,615, filed on Nov. 30, 2001, now abandoned, which is a continuation of application No. 09/389,553, filed on Sep. 3, 1999, now Pat. No. 6,333,016, application No. 10/834,351, which is a continuation-in-part of application No. 10/720,247, filed on Nov. 24, 2003, now Pat. No. 7,354,881, which is a continuation of application No. 10/118,834, filed on Apr. 8, 2002, now abandoned.

(60) Provisional application No. 60/137,206, filed on Jun. 2, 1999, provisional application No. 60/307,208, filed on Jul. 23, 2001, provisional application No. 60/465,957, filed on Apr. 28, 2003.

(51) Int. Cl.
    *B82B 1/00* (2006.01)
(52) U.S. Cl. ............ 257/213; 423/447.1; 977/932
(58) Field of Classification Search .......... 257/213; 423/447.1; 977/932
    See application file for complete search history.

(56) References Cited

U.S. PATENT DOCUMENTS

| | | |
|---|---|---|
| 3,746,657 A | 7/1973 | Miller et al. |
| 4,456,694 A | 6/1984 | Blaskie et al. |
| 4,574,120 A | 3/1986 | Thompson |
| 4,663,230 A | 5/1987 | Tennent |
| 5,165,909 A | 11/1992 | Tennent et al. |
| 5,227,038 A | 7/1993 | Smalley et al. |
| 5,300,203 A | 4/1994 | Smalley |
| 5,405,996 A | 4/1995 | Suzuki et al. |
| 5,424,054 A | 6/1995 | Bethune |
| 5,482,601 A | 1/1996 | Ohshima et al. |
| 5,500,200 A | 3/1996 | Mandeville et al. |
| 5,543,378 A | 8/1996 | Wang |
| 5,556,517 A | 9/1996 | Smalley |
| 5,560,898 A | 10/1996 | Uchida et al. |
| 5,578,543 A | 11/1996 | Tennent et al. |
| 5,587,141 A | 12/1996 | Ohshima et al. |
| 5,591,312 A | 1/1997 | Smalley |
| 5,603,907 A | 2/1997 | Grochowski |
| 5,641,466 A | 6/1997 | Ebbesen et al. |
| 5,648,056 A | 7/1997 | Tanaka |
| 5,695,734 A | 12/1997 | Ikazaki et al. |
| 5,698,175 A | 12/1997 | Hiura et al. |
| 5,707,916 A | 1/1998 | Snyder et al. |
| 5,744,235 A | 4/1998 | Creehan |
| 5,747,161 A | 5/1998 | Iijima |
| 5,753,088 A | 5/1998 | Olk |

(Continued)

FOREIGN PATENT DOCUMENTS

EP 0 945 402 A1 9/1999

(Continued)

OTHER PUBLICATIONS

Cassell et al., "Directed Growth of Free-Standing Single-Walled Carbon Nanotubes" in JACS vol. 121 pp. 7975-7976 1999.*

(Continued)

*Primary Examiner*—Stuart Hendrickson
(74) *Attorney, Agent, or Firm*—McAfee & Taft

(57) ABSTRACT

Composites of single-walled carbon nanotubes (SWNTs) and a ceramic support (e.g., silica) comprising a small amount of catalytic metal, e.g., cobalt and molybdenum, are described. The particle comprising the metal and ceramic support is used as the catalyst for the production of the single-walled carbon nanotubes. The nanotube-ceramic composite thus produced can be used "as prepared" without further purification providing significant cost advantages. The nanotube-ceramic composite has also been shown to have improved properties versus those of purified carbon nanotubes in certain applications such as field emission devices. Use of precipitated and fumed silicas has resulted in nanotube-ceramic composites which may synergistically improve the properties of both the ceramic (e.g., silica) and the single-walled carbon nanotubes. Addition of these composites to polymers may improve their properties. These properties include thermal conductivity, thermal stability (tolerance to degradation), electrical conductivity, modification of crystallization kinetics, strength, elasticity modulus, fracture toughness, and other mechanical properties. Other nanotube-ceramic composites may be produced based on $Al_2O_3$, MgO and $ZrO_2$, for example, which are suitable for a large variety of applications.

79 Claims, 10 Drawing Sheets

U.S. PATENT DOCUMENTS

| | | | |
|---|---|---|---|
| 5,773,834 | A | 6/1998 | Yamamoto et al. |
| 5,780,101 | A | 7/1998 | Nolan et al. |
| 5,814,290 | A | 9/1998 | Niu et al. |
| 5,877,110 | A | 3/1999 | Snyder et al. |
| 5,965,267 | A | 10/1999 | Nolan et al. |
| 5,985,232 | A | 11/1999 | Howard et al. |
| 5,997,832 | A | 12/1999 | Lieber et al. |
| 6,221,330 | B1 | 4/2001 | Moy et al. |
| 6,312,303 | B1 | 11/2001 | Yaniv et al. |
| 6,333,016 | B1 | 12/2001 | Resasco et al. |
| 6,346,189 | B1 | 2/2002 | Dai et al. |
| 6,401,526 | B1 | 6/2002 | Dai et al. |
| 6,413,487 | B1 | 7/2002 | Resasco et al. |
| 6,426,134 | B1 | 7/2002 | Lavin et al. |
| 6,432,866 | B1 | 8/2002 | Tennent et al. |
| 6,479,939 | B1 | 11/2002 | Yaniv et al. |
| 6,573,643 | B1 | 6/2003 | Kumar et al. |
| 6,580,225 | B2 | 6/2003 | Yaniv et al. |
| 6,596,187 | B2 | 7/2003 | Coll et al. |
| 6,599,961 | B1 | 7/2003 | Pienkowski et al. |
| 6,656,339 | B2 | 12/2003 | Talin et al. |
| 6,664,722 | B1 | 12/2003 | Yaniv et al. |
| 6,692,717 | B1 | 2/2004 | Smalley et al. |
| 6,699,457 | B2 | 3/2004 | Cortright et al. |
| 6,756,025 | B2 | 6/2004 | Colbert et al. |
| 6,761,870 | B1 | 7/2004 | Smalley et al. |
| 6,994,907 | B2 * | 2/2006 | Resasco et al. ............ 428/367 |
| 7,354,881 | B2 * | 4/2008 | Resasco et al. ............ 502/185 |
| 2001/0031900 | A1 | 10/2001 | Margrave et al. |
| 2002/0127169 | A1 | 9/2002 | Smalley et al. |
| 2002/0165091 | A1 | 11/2002 | Resasco et al. |
| 2003/0077515 | A1 | 4/2003 | Chen et al. |
| 2003/0089893 | A1 | 5/2003 | Niu et al. |
| 2003/0147802 | A1 | 8/2003 | Smalley et al. |
| 2003/0175200 | A1 | 9/2003 | Smalley et al. |
| 2003/0180526 | A1 | 9/2003 | Winey et al. |
| 2004/0009346 | A1 | 1/2004 | Jang et al. |
| 2004/0028859 | A1 | 2/2004 | LeGrande et al. |

FOREIGN PATENT DOCUMENTS

| | | |
|---|---|---|
| EP | 01 93 9821 | 6/2004 |
| JP | 406122489 | 5/1994 |
| WO | WO 97/09272 | 3/1997 |
| WO | WO 98/39250 | 9/1998 |
| WO | WO 98/42620 | 10/1998 |
| WO | WO 00/17102 | 3/2000 |
| WO | PCT/US00/15362 | 10/2000 |
| WO | WO 00/73205 | 12/2000 |
| WO | PCT/US02/023155 | 7/2002 |
| WO | PCT/US03/019664 | 6/2003 |
| WO | PCT/US03/19664 | 6/2003 |
| WO | WO 03/048038 | 6/2003 |
| WO | PCT/US02/23155 | 7/2003 |
| WO | WO 2004/001107 | 12/2003 |
| WO | PCT/US2004/012986 | 5/2005 |

OTHER PUBLICATIONS

Chattopadhyay, et al., "A Route for Bulk Separation of Semiconducting from Metallic Singel-Wall Carbon Nanotubes", Journal of American Chemical Society, vol. 125, No. 11, pp. 3370-3375, 2003.
Chen et al., "Bulk Separative Enrichment in Metallic or Semiconducting Single-Walled Carbon Nanotubes",Nano Letters, vol. 3, No. 9, pp. 1245-1249, Sep. 2003.
Patent Abstracts of Japan, vol. 1996, No. 12, Dec. 26, 1996, and JP 0 8 198611 A (NEC Corp), Aug. 6, 1996, Abstract.
Tahji et al., "Purification Procedure for Single-Wall Nanotubes", J. Phys. Chem. B, vol. 101, pp. 1974-1978 (1997).
Alvarez, et al., "Synergism of Co and Mo in the catalytic production of single-wall carbon nanotubes by decomposition of CO", *Elsevier Science Ltd.*, Carbon 39 (2001), pp. 547-558.
Anderson et al., "50 nm Polystyrene Particles via Miniemulsion Polymerization", Macromolecules, American Chemical Society, vol. 35, pp. 574-576, 2002.
Bandow et al., "Effect of the Growth Temperature on the Diameter Distribution and Chirality of Single-Wall Carbon Nanotubes", *The American Physical Society*, Physical Review Letters, vol. 80, No. 17, (1998), pp. 3779-3782.
Bethune et al. "Cobalt-Catalysed Growth of Carbon Nanotubes with Single-Atomic-Layer Walls", Letters to Nature, vol. 363, pp. 605-607, Jun. 17, 1993.
Bower et al., "Deformation of Carbon Nanotubes in Nanotube-Polymer Composites", Applied Physics Letters, vol. 74, No. 22, pp. 3317-3319, May 31, 1999.
V. Brotons et al., "Catalytic influence of bimetallic phases for the synthesis of single-walled carbon nanotubes", Journal of Molecular Catalysis, A: Chemical, vol. 116, pp. 397-403, Dec. 16, 1997.
Cadek et al., "Mechanical and Thermal Properties of CNT and CNF Reinforced Polymer Composites", Structural and Electronic Properties of Molecular Nanostructures, American Institute of Physics, pp. 562-565, 2002.
Cassell et al., "Large Scale CVD Synthesis of Single-Walled Carbon Nanotubes", J. Phys. Chem. B., American Chemical Society, vol. 103, pp. 6484-6492, 1999.
Chaturvedi et al., "Properties of pure and sulfided NiMo04 and CoMo04 catalysts: TPR, XANES and time-resolved XRD studies", Database Accession No. EIX99044490981 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, 1998, Mrs. Warrendale, PA, USA.
Che et al., "Chemical Vapor Deposition Based Synthesis of Carbon Nanotubes and Nanofibers Using a Template Method", Chemical Mater., vol. 10, pp. 260-267, 1998.
Chen et al., "Dissolution of Full-Length Single-Walled Carbon Nanotubes", J. Phys. Chem. B, vol. 105, pp. 2525-2528, 2001.
Chen et al., "Growth of carbon nanotubes by catalytic decompositon of $CH_4$ or CO on a Ni-MgO catalyst", Carbon vol. 35, No. 10-11, pp. 1495-1501, 1997.
Cheng et al.,"Bulk Morphology and Diameter Distribution of Single-Walled Carbon Nanotubes Synthesized by Catalytic Decomposition of Hydrocarbons", Chemical Physics Letters, vol. 289, pp. 602-610, Jun. 19, 1998.
Cheng et al., "Large-Scale and Low-Cost Synthesis of Single-Walled Carbon Nanotubes by the Catalytic Pyrolysis of Hydrocarbons", Applied Physics Letters, vol. 72, No. 25, pp. 3282-3284, Jun. 22, 1998.
Dai et al., "Single-Wall Nanotubes Produced by Metal-Catalyzed Disproportionation of Carbon Monoxide", Chemical Physics Letters, vol. 260, pp. 471-475, Sep. 27, 1996.
Database, Accession No. 1999-366878, Cano, "Canon KK", XP-002149235, May 25, 1999.
De Boer et al., "The cobalt-molybdenum interaction in $CoMo/SiO_2$ catalysts: A CO-oxidation study", *Elsevier Science Ltd.*, Solid State Ionics 63-65 (1993), pp. 736-742.
Deng et al., "Hybrid Composite of Polyaniline Containing Carbon Nanotube", Chinese Chemical Letters, vol. 12, pp. 1037-1040, 2001.
Fonseca et al., "Synthesis of single-and multi-wall carbon nanotubes over supported catalysts", Applied Physics A, vol. 67, pp. 11-22, 1998.
Franco et al., "Electric and magnetic properties of polymer electrolyte/carbon black composites", Solid State Ionics 113-115, pp. 149-160, 1998.
Gaspar et al., "The influence of Cr precursors in the ethylene polymerization on $Cr/SiO_2$ catalysts", Applied Catalysis A: General, vol. 227, pp. 240-254, 2002.
Gong et al., "Surfactant-Assisted Processing of Carbon Nanotube/Polymer Composites", Chemical Material, vol. 12, pp. 1049-1052, 2000.
Govindaraj et al., "Carbon structures obtained by the disproportionation of carbon monoxide over nickel catalysts", Materials Research Bulletin, vol. 33, No. 4, pp. 663-667, 1998.

Hafner et al., "Catalytic growth of single-wall carbon nanotubes from metal particles", Chemical Physics Letters, vol. 296, pp. 195-202, 1998.

Hamon et al., "End-group and defect analysis of soluble single-walled carbon nanotubes", Chemical Physics Letters, vol. 347 pp. 8-12, 2001.

Hernadi et al., "Catalytic synthesis of carbon nanotubes using zeolite support", Elsevier Science Inc. 1996.

Hwang et al., "Carbon nanotube reinforced ceramics", Journal of Materials Chemistry, vol. 11, pp. 1722-1725, 2001.

Hyperion Catalysis International Website; http://www.fibrils.com/esd.htm;"Unique Slough Resistant SR™ Series ESD Thermoplastic Product Line Offers Reduced Particle Contamination for Demanding Electronic Applications," and Hyperion Homepage http://www.fibrils.com , Nov. 19, 2001.

Iijima, "Helical Microtubules of Graphitic Carbon", Letters to Nature, vol. 354, pp. 56-58, Nov. 7, 1991.

Iijima et al., "Single-Shell Carbon Nanotubes of 1-nm Diameter", Letters to Nature, vol. 363, pp. 603-605, Jun. 17, 1993.

Ivanov et al., "The Study of Carbon Nanotubules Produced by Catalytic Method", Chemical Physics Letters, vol. 223, pp. 329-335, 1994.

Jin et al., "Alignment of Carbon nanotubes in a polymer matrix by mechanical stretching", Applied Physics Letters, vol. 73, No. 9, pp. 1197-1199, Aug. 31, 1998.

Journet et al., "Large-Scale Production of Single-Walled Carbon Nanotubes by the Electric-Arc Technique", Letters to Nature, vol. 338, pp. 756-758, Aug. 21, 1997.

Kitiyanan et al., "Controlled production of single-wall carbon nanotubes by catalytic decomposition of CO on bimetallic Co-Mo catalysts", Chemical Physics Letters, vol. 317 , pp. 497-503, Feb. 4, 2000.

Krishnankutty et al., "The Effect of Copper on the Structural Characteristics of Carbon Filaments Produced from Iron Catalyzed Decomposition of Ethylene," Catalysts Today, vol. 37, pp. 295-307, 1997.

Landfester et al., "Miniemulsion polymerization", Jun. 4, 2003, http://www.mpikg-golm.mpg.de/kc/landfester/, 1-22.

Landfester, "Polyreactions in Miniemulsions", Macromol. Rapid Commun., vol. 22, No. 12, pp. 896-936, 2001.

Landfester, "The Generation of Nanoparticles in Miniemulsions", Advanced Materials, vol. 13, No. 10, pp. 765-768, May 17, 2001.

Li et al., "Large-Scale Synthesis of Aligned Carbon Nanotubes", Science, vol. 274, pp. 1701-1703, Dec. 6, 1996.

McCarthy et al., "A Microscopic and Spectroscopic Study of Interactions between Carbon Nanotubes and a Conjugated Polymer", J. Phys. Chem. B, vol. 106, pp. 2210-2216, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, 2001.

Pompeo et al., "Water Solubilization of Single-Walled Carbon Nanotubes by Functionalization with Glucosamine", Nano Letters, American Chemical Society, vol. 2, No. 4, pp. 369-373, 2002.

Qian et al., "Load transfer and deformation mechanisms in carbon nanotube-polystyrene composites",Applied Physics Letters, American Institute of Physics, vol. 76, No. 20, pp. 2868-2870, May 15, 2000.

Razavi, "Metallocene catalysts technology and environment", Chemistry 3, pp. 615-625, 2000.

Rinzler et al., "Large-Scale Purification of Single-Wall Carbon Nanotubes: Process, Product, and Characterization," Applied Physics A, vol. 67, pp. 29-37, 1998.

Sears et al., "Raman scattering from polymerizing styrene. I. Vibrational mode analysis $^a$)", J. Chem. Phys., vol. 75, No. 4, pp. 1589-1598.

Shaffer et al., "Fabrication and Characterization of Carbon Nanotube/Poly (vinyl alcohol) Composites**", Advanced Materials, vol. II, No. 11, pp. 937-941, 1999.

Thess et al., "Crystalline Ropes of Metallic Carbon Nanotubes", Science, vol. 273, pp. 483-487, Jul. 26, 1996.

Tiarks et al., "Encapsulation of Carbon Black by Miniemulsion Polymerization", Macromol. Chem. Phys., vol. 202, pp. 51-60, 2001.

Tiarks et al., "Silica Nanoparticles as Surfactants and Fillers for Latexes Made by Miniemulsion Polymerization", Langmuir, American Chemical Society, vol. 17, pp. 5775-5780, 2001.

Willems et al., "Control of the outer diameter of thin carbon nanotubes synthesized by catalytic decomposition of hydrocarbons", Chemical physics Letters, vol. 317, pp. 71-76, Jan. 28, 2000.

Yakobson et al.; "Fullerene Nanotubes: $C_{1,000,000}$ and Beyond," American Scientist, vol. 85, pp. 324-337, Jul.-Aug. 1997.

Zhao, et al., "Chromatographic Purification and Properties of Soluble Single-Walled Carbon Nanotubes", American Chemical Society, Page Est: 4.1, pp. A-E, Feb. 22, 2001.

Zhu et al., "Direct Synthesis of Long Single-Walled Carbon Nanotube Strands", Science, vol. 296, pp. 884-886, May 13, 2002.

Alvarez, et al., "Synergism of Co and Mo in the catalytic production of single-wall carbon nanotubes by decomposition of CO", Elsevier Science Ltd., Carbon 39 (2001), pp. 547-558.

Anderson et al., "50 nm Polystyrene Particles via Miniemulsion Polymerization", Macromolecules, American Chemical Society, vol. 35, pp. 574-576, 2002.

Bandow et al., "Effect of the Growth Temperature on the Diameter Distribution and Chirality of Single-Wall Carbon Nanotubes", The American Physical Society, Physical Review Letters, vol. 80, No. 17, (1998), pp. 3779-3782.

Bethune et al. "Cobalt-Catalysed Growth of Carbon Nanotubes with Single-Atomic-Layer Walls", Letters to Nature, vol. 363, pp. 605-607, Jun. 17, 1993.

Bower et al., "Deformation of Carbon Nanotubes in Nanotube-Polymer Composites", Applied Physics Letters, vol. 74, No. 22, pp. 3317-3319, May 31, 1999.

V. Brotons et al., "Catalytic influence of bimetallic phases for the synthesis of single-walled carbon nanotubes", Journal of Molecular Catalysis, A: Chemical, vol. 116, pp. 397-403, Dec. 16, 1997.

Cadek et al., "Mechanical and Thermal Properties of CNT and CNF Reinforced Polymer Composites", Structural and Electronic Properties of Molecular Nanostructures, American Institute of Physics, pp. 562-565, 2002.

Cassell et al., "Large Scale CVD Synthesis of Single-Walled Carbon Nanotubes", J. Phys. Chem. B., American Chemical Society, vol. 103, pp. 6484-6492, 1999.

Chaturvedi et al., "Properties of pure and sulfided NiMo04 and CoMo04 catalysts: TPR, XANES and time-resolved XRD studies", Database Accession No. EIX99044490981 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, 1998, Mrs. Warrendale, PA, USA.

Che et al., "Chemical Vapor Deposition Based Synthesis of Carbon Nanotubes and Nanofibers Using a Template Method", Chemical Mater., vol. 10, pp. 260-267, 1998.

Chen et al., "Dissolution of Full-Length Single-Walled Carbon Nanotubes", J. Phys. Chem. B, vol. 105, pp. 2525-2528, 2001.

Chen et al., "Growth of carbon nanotubes by catalytic decompositon of $CH_4$ or CO on a Ni-MgO catalyst", Carbon vol. 35, No. 10-11, pp. 1495-1501, 1997.

Cheng et al.,"Bulk Morphology and Diameter Distribution of Single-Walled Carbon Nanotubes Synthesized by Catalytic Decomposition of Hydrocarbons", Chemical Physics Letters, vol. 289, pp. 602-610, Jun. 19, 1998.

Cheng et al., "Large-Scale and Low-Cost Synthesis of Single-Walled Carbon Nanotubes by the Catalytic Pyrolysis of Hydrocarbons", Applied Physics Letters, vol. 72, No. 25, pp. 3282-3284, Jun. 22, 1998.

Dai et al., "Single-Wall Nanotubes Produced by Metal-Catalyzed Disproportionation of Carbon Monoxide", Chemical Physics Letters, vol. 260, pp. 471-475, Sep. 27, 1996.

Database, Accession No. 1999-366878, Cano, "Canon KK", XP-002149235, May 25, 1999.

De Boer et al., "The cobalt-molybdenum interaction in $CoMo/SiO_2$ catalysts: A CO-oxidation study", Elsevier Science Ltd., Solid State Ionics 63-65 (1993), pp. 736-742.

Deng et al., "Hybrid Composite of Polyaniline Containing Carbon Nanotube", Chinese Chemical Letters, vol. 12, pp. 1037-1040, 2001.

Fonseca et al., "Synthesis of single-and multi-wall carbon nanotubes over supported catalysts", Applied Physics A, vol. 67, pp. 11-22, 1998.

Franco et al., "Electric and magnetic properties of polymer electrolyte/carbon black composites", Solid State Ionics 113-115, pp. 149-160, 1998.

Gaspar et al., "The influence of Cr precursors in the ethylene polymerization on $Cr/SiO_2$ catalysts", Applied Catalysis A: General, vol. 227, pp. 240-254, 2002.

Gong et al., "Surfactant-Assisted Processing of Carbon Nanotube/Polymer Composites", Chemical Material, vol. 12, pp. 1049-1052, 2000.

Govindaraj et al., "Carbon structures obtained by the disproportionation of carbon monoxide over nickel catalysts", Materials Research Bulletin, vol. 33, No. 4, pp. 663-667, 1998.

Hafner et al., "Catalytic growth of single-wall carbon nanotubes from metal particles", Chemical Physics Letters, vol. 296, pp. 195-202, 1998.

Hamon et al., "End-group and defect analysis of soluble single-walled carbon nanotubes", Chemical Physics Letters, vol. 347 pp. 8-12, 2001.

Hernadi et al., "Catalytic synthesis of carbon nanotubes using zeolite support", Elsevier Science Inc. 1996.

Hwang et al., "Carbon nanotube reinforced ceramics", Journal of Materials Chemistry, vol. 11, pp. 1722-1725, 2001.

Hyperion Catalysis International Website; http://www.fibrils.com/esd.htm;"Unique Slough Resistant SR™ Series ESD Thermoplastic Product Line Offers Reduced Particle Contamination for Demanding Electronic Applications," and Hyperion Homepage http://www.fibrils.com.

Iijima, "Helical Microtubules of Graphitic Carbon", Letters to Nature, vol. 354, pp. 56-58, Nov. 7, 1991.

Iijima et al., "Single-Shell Carbon Nanotubes of 1-nm Diameter", Letters to Nature, vol. 363, pp. 603-605, Jun. 17, 1993.

Ivanov et al., "The Study of Carbon Nanotubules Produced by Catalytic Method", Chemical Physics Letters, vol. 223, pp. 329-335, 1994.

Jin et al., "Alignment of Carbon nanotubes in a polymer matrix by mechanical stretching", Applied Physics Letters, vol. 73, No. 9, pp. 1197-1199, Aug. 31, 1998.

Journet et al., "Large-Scale Production of Single-Walled Carbon Nanotubes by the Electric-Arc Technique", Letters to Nature, vol. 338, pp. 756-758, Aug. 21, 1997.

Kitiyanan et al., "Controlled production of single-wall carbon nanotubes by catalytic decomposition of CO on bimetallic Co-Mo catalysts", Chemical Physics Letters, vol. 317, pp. 497-503, Feb. 4, 2000.

Krishnankutty et al., "The Effect of Copper on the Structural Characteristics of Carbon Filaments Produced from Iron Catalyzed Decomposition of Ethylene," Catalysts Today, vol. 37, pp. 295-307, 1997.

Landfester et al., "Miniemulsion polymerization", Jun. 4, 2003, http://www.mpikg-golm.mpg.de/kc/landfester/, 1-22.

Landfester, "Polyreactions in Miniemulsions", Macromol. Rapid Commun., vol. 22, No. 12, pp. 896-936, 2001.

Landfester, "The Generation of Nanoparticles in Miniemulsions", Advanced Materials, vol. 13, No. 10, pp. 765-768, May 17, 2001.

Li et al., "Large-Scale Synthesis of Aligned Carbon Nanotubes", Science, vol. 274, pp. 1701-1703, Dec. 6, 1996.

McCarthy et al., "A Microscopic and Spectroscopic Study of Interactions between Carbon Nanotubes and a Conjugated Polymer", J. Phys. Chem. B, vol. 106, pp. 2210-2216, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, 2001.

Pompeo et al., "Water Solubilization of Single-Walled Carbon Nanotubes by Functionalization with Glucosamine", Nano Letters, American Chemical Society, vol. 2, No. 4, pp. 369-373, 2002.

Qian et al., "Load transfer and deformation mechanisms in carbon nanotube-polystyrene composites",Applied Physics Letters, American Institute of Physics, vol. 76, No. 20, pp. 2868-2870, May 15, 2000.

Razavi, "Metallocene catalysts technology and environment", Chemistry 3, pp. 615-625, 2000.

Rinzler et al., "Large-Scale Purification of Single-Wall Carbon Nanotubes: Process, Product, and Characterization," Applied Physics A, vol. 67, pp. 29-37, 1998.

Sears et al., "Raman scattering from polymerizing styrene. I. Vibrational mode analysis $^a$)", J. Chem. Phys., vol. 75, No. 4, pp. 1589-1598.

Shaffer et al., "Fabrication and Characterization of Carbon Nanotube/Poly (vinyl alcohol) Composites**", Advanced Materials, vol. II, No. 11, pp. 937-941, 1999.

Thess et al., "Crystalline Ropes of Metallic Carbon Nanotubes", Science, vol. 273, pp. 483-487, Jul. 26, 1996.

Tiarks et al., "Encapsulation of Carbon Black by Miniemulsion Polymerization", Macromol. Chem. Phys., vol. 202, pp. 51-60, 2001.

Tiarks et al., "Silica Nanoparticles as Surfactants and Fillers for Latexes Made by Miniemulsion Polymerization", Langmuir, American Chemical Society, vol. 17, pp. 5775-5780, 2001.

Willems et al., "Control of the outer diameter of thin carbon nanotubes synthesized by catalytic decomposition of hydrocarbons", Chemical physics Letters, vol. 317, pp. 71-76, Jan. 28, 2000.

Yakobson et al.; "Fullerene Nanotubes: $C_{1,000,000}$ and Beyond," American Scientist, vol. 85, pp. 324-337, Jul.-Aug. 1997.

Zhao, et al., "Chromatographic Purification and Properties of Soluble Single-Walled Carbon Nanotubes", American Chemical Society, Page Est: 4.1, pp. A-E, Feb. 22, 2001.

Zhu et al., "Direct Synthesis of Long Single-Walled Carbon Nanotube Strands", Science, vol. 296, pp. 884-886, May 13, 2002.

U.S. Appl. No. 60/101,093, filed Sep. 18, 1998 (PCT application number: PCT/US99/21367).

Chattopadhyay, et al., "A Route for Bulk Separation of Semiconducting from Metallic Singel-Wall Carbon Nanotubes", Journal of American Chemical Society, vol. 125, No. 11, pp. 3370-3375, 2003.

Chen et al., "Bulk Separative Enrichment in Metallic or Semiconducting Single-Walled Carbon Nanotubes", Nano Letters, xxxx vol. 0, No. 0, page est: 4.9 A-E.

Patent Abstracts of Japan, vol. 1996, No. 12, Dec. 26, 1996, and JP 0 8 198611 A (NEC Corp), Aug. 6, 1996, Abstract.

Tahji et al., "Purification Procedure for Single-Wall Nanotubes", J. Phys. Chem. B, vol. 101, pp. 1974-1978 (1997).

Alvarez, et al., "Synergism of Co and Mo in the catalytic production of single-wall carbon nanotubes by decomposition of CO", Elsevier Science Ltd., Carbon 39 (2001), pp. 547-558, v. 139 No. 4, Apr. 2001.

Anderson et al., "50 nm Polystyrene Particles via Miniemulsion Polymerization", Macromolecules, American Chemical Society, vol. 35, pp. 574-576, 2002, Dec. 18, 2001.

Bandow et al., "Effect of the Growth Temperature on the Diameter Distribution and Chirality of Single-Wall Carbon Nanotubes", The American Physical Society, Physical Review Letters, vol. 80, No. 17, (1998), pp. 3779-3782, Apr. 27, 1998.

Cadek et al., "Mechanical and Thermal Properties of CNT and CNF Reinforced Polymer Composites", Structural and Electronic Properties of Molecular Nanostructures, American Institute of Physics, pp. 562-565, Oct. 2002.

Cassell et al., "Large Scale CVD Synthesis of Single-Walled Carbon Nanotubes", J. Phys. Chem. B., American Chemical Society, vol. 103, pp. 6484-6492, Jul. 10, 1999.

Chaturvedi et al., "Properties of pure and sulfided NiMo04 and CoMo04 catalysts: TPR, XANES and time-resolved XRD studies", Database Accession No. EIX99044490981 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, Oct. 1998, Mrs. Warrendale, PA, USA.

Che et al., "Chemical Vapor Deposition Based Synthesis of Carbon Nanotubes and Nanofibers Using a Template Method", Chemical Mater., vol. 10, pp. 260-267, Jan. 19, 1998.

Chen et al., "Dissolution of Full-Length Single-Walled Carbon Nanotubes", J. Phys. Chem. B, vol. 105, pp. 2525-2528, Mar. 10, 2001.

Chen et al., "Growth of carbon nanotubes by catalytic decompositon of $CH_4$ or CO on a Ni-MgO catalyst", Carbon vol. 35, No. 10-11, pp. 1495-1501, May 17, 1998.

De Boer et al., "The cobalt-molybdenum interaction in CoMo/SiO$_2$ catalysts: A CO-oxidation study", *Elsevier Science Ltd.*, Solid State Ionics 63-65 (1993), pp. 736-742, Sep. 1993.

Fonseca et al., "Synthesis of single-and multi-wall carbon nanotubes over supported catalysts", Applied Physics A, vol. 67, pp. 11-22, Jul. 1, 1998.

Gaspar et al., "The influence of Cr precursors in the ethylene polymerization on Cr/SiO$_2$ catalysts", Applied Catalysis A: General, vol. 227, pp. 240-254, Feb. 22, 2002.

Gong et al., "Surfactant-Assisted Processing of Carbon Nanotube/Polymer Composites", Chemical Material, vol. 12, pp. 1049-1052, Mar. 17, 2000.

Govindaraj et al., "Carbon structures obtained by the disproportionation of carbon monoxide over nickel catalysts", Materials Research Bulletin, vol. 33, No. 4, pp. 663-667, Jul. 6, 1998.

Hafner et al., "Catalytic growth of single-wall carbon nanotubes from metal particles", Chemical Physics Letters, vol. 296, pp. 195-202, Oct. 30, 1998.

Hamon et al., "End-group and defect analysis of soluble single-walled carbon nanotubes", Chemical Physics Letters, vol. 347 pp. 8-12, Oct. 30, 2001.

Hernadi et al., "Catalytic synthesis of carbon nanotubes using zeolite support", Elsevier Science Inc. Jun. 5, 1996.

Hwang et al., "Carbon nanotube reinforced ceramics", Journal of Materials Chemistry, vol. 11, pp. 1722-1725, May 1, 2001.

Hyperion Catalysis International Website; http://www.fibrils.com/esd.htm ;"Unique Slough Resistant SR™ Series ESD Thermoplastic Product Line Offers Reduced Particle Contamination for Demanding Electronic Applications," and Hyperion Homepage http://www.fibrils.com , Nov. 19, 2001.

Ivanov et al., "The Study of Carbon Nanotubules Produced by Catalytic Method", Chemical Physics Letters, vol. 223, pp. 329-335, Jun. 24, 1994.

Kitiyanan et al., "Controlled production of single-wall carbon nanotubes by catalytic decomposition of CO on bimetallic Co-Mo catalysts", Chemical Physics Letters, vol. 317 , pp. 497-503, Feb. 1, 2000.

Krishnankutty et al., "The Effect of Copper on the Structural Characteristics of Carbon Filaments Produced from Iron Catalyzed Decomposition of Ethylene," Catalysts Today, vol. 37, pp. 295-307, Aug. 15, 1997.

Landfester, "Polyreactions in Miniemulsions", Macromol. Rapid Commun., vol. 22, No. 12, pp. 896-936, Aug. 30, 2001.

McCarthy et al., "A Microscopic and Spectroscopic Study of Interactions between Carbon Nanotubes and a Conjugated Polymer", J. Phys. Chem. B, vol. 106, pp. 2210-2216, Oct. 9, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, Jan. 9, 2001.

Pompeo et al., "Water Solubilization of Single-Walled Carbon Nanotubes by Functionalization with Glucosamine", Nano Letters, American Chemical Society, vol. 2, No. 4, pp. 369-373, Jan. 10, 2002.

Razavi, "Metallocene catalysts technology and environment", Chemistry 3, pp. 615-625, Oct. 1, 2000.

Rinzler et al., "Large-Scale Purification of Single-Wall Carbon Nanotubes: Process, Product, and Characterization," Applied Physics A, vol. 67, pp. 29-37, Jul. 1998.

Sears et al., "Raman scattering from polymerizing styrene. I. Vibrational mode analysis $^a$)", J. Chem. Phys., vol. 75, No. 4, pp. 1589-1598, Aug. 15, 1981.

Shaffer et al., "Fabrication and Characterization of Carbon Nanotube/Poly (vinyl alcohol) Composites**", Advanced Materials, vol. II, No. 11, pp. 937-941, Aug. 5, 1999.

Tiarks et al., "Encapsulation of Carbon Black by Miniemulsion Polymerization", Macromol. Chem. Phys., vol. 202, pp. 51-60, Jan. 25, 2001.

Tiarks et al., "Silica Nanoparticles as Surfactants and Fillers for Latexes Made by Miniemulsion Polymerization", Langmuir, American Chemical Society, vol. 17, pp. 5775-5780, Aug. 21, 2001.

Zhu et al., "Direct Synthesis of Long Single-Walled Carbon Nanotube Strands", Science, vol. 296, pp. 884-886, May 3, 2002.

U.S. Appl. No. 60/101,093, filed Sep. 18, 1998 (PCT application No. PCT/US99/21367).

Chattopadhyay, et al., "A Route for Bulk Separation of Semiconducting from Metallic Singel-Wall Carbon Nanotubes", Journal of American Chemical Society, vol. 125, No. 11, pp. 3370-3375, Feb. 22, 2003.

Chen et al., "Bulk Separative Enrichment in Metallic or Semiconducting Single-Walled Carbon Nanotubes",Nano Letters, vol. 3, No. 9, pp. 1245-1249, Aug. 20, 2003.

Tahji et al., "Purification Procedure for Single-Wall Nanotubes", J. Phys. Chem. B, vol. 101, pp. 1974-1978, Feb. 1, 1997.

* cited by examiner

SINGLE-WALLED CARBON NANOTUBE-CERAMIC COMPOSITES AND METHODS OF USE

CROSS-REFERENCE TO RELATED APPLICATIONS

The present application is a continuation-in-part of U.S. Ser. No. 10/423,687, filed Apr. 25, 2003, now U.S. Pat. No. 6,994,907 which is a continuation of U.S. Ser. No. 09/998,615, filed Nov. 30, 2001, now abandoned, which is a continuation of U.S. Ser. No. 09/389,553, filed Sep. 3, 1999, now U.S. Pat. No. 6,333,016, which claims the benefit of U.S. Provisional Application Ser. No. 60/137,206, filed Jun. 2, 1999, each of which is hereby expressly incorporated by reference herein in its entirety.

The present application is also a continuation-in-part of U.S. Ser. No. 10/720,247, filed Nov. 24, 2003 now U.S. Pat. No. 7,354,881, which is a continuation of U.S. Ser. No. 10/118,834, filed Apr. 8, 2002 now abandoned, which claims the benefit of U.S. Provisional Application Ser. No. 60/307,208, filed Jul. 23, 2001, each of which are hereby expressly incorporated herein by reference in its entirety.

The present application also claims the benefit of U.S. Provisional Application Ser. No. 60/465,957, filed Apr. 28, 2003, which is hereby incorporated by reference herein in its entirety.

STATEMENT REGARDING FEDERALLY SPONSORED RESEARCH OR DEVELOPMENT

Not Applicable.

BACKGROUND OF THE INVENTION

This invention is related to the field of carbon nanotubes, and more particularly, but not by way of limitation, to composites and products comprising single-walled carbon nanotubes.

Carbon nanotubes (also referred to as carbon fibrils) are seamless tubes of graphite sheets with full fullerene caps which were first discovered as multi-layer concentric tubes or multi-walled carbon nanotubes and subsequently as single-walled carbon nanotubes in the presence of transition metal catalysts. Carbon nanotubes have shown promising applications including nanoscale electronic devices, high strength materials, electron field emission, tips for scanning probe microscopy, and gas storage.

Generally, single-walled carbon nanotubes are preferred over multi-walled carbon nanotubes for use in these applications because they have fewer defects and are therefore stronger and more conductive than multi-walled carbon nanotubes of similar diameter. Defects are less likely to occur in single-walled carbon nanotubes than in multi-walled carbon nanotubes because multi-walled carbon nanotubes can survive occasional defects by forming bridges between unsaturated carbon valances, while single-walled carbon nanotubes have no neighboring walls to compensate for defects.

Single-walled carbon nanotubes exhibit exceptional chemical and physical properties that have opened a vast number of potential applications.

However, the availability of these new single-walled carbon nanotubes in quantities and forms necessary for practical technology is still problematic. Large scale processes for the production of high quality single-walled carbon nanotubes are still needed, and suitable forms of the single-walled carbon nanotubes for application to various technologies are still needed. It is to satisfying these needs that the present invention is directed.

DESCRIPTION OF THE INVENTION

The present invention contemplates composites of single-walled carbon nanotubes (SWNTs) and a ceramic support (e.g., silica) comprising a small amount of catalytic metal, e.g., cobalt and molybdenum. The particle comprising the metal and ceramic support is used as the catalyst for the production of the single-walled carbon nanotubes. The nanotube-ceramic composite thus produced can be used "as prepared" without further purification providing significant cost advantages. The nanotube-ceramic composite has also been shown to have improved properties versus those of purified carbon nanotubes in certain application such as field emission.

Furthermore, with adjustment of the structure of the ceramic component, e.g., by using a silica support without microporosity, such as precipitated and fumed silicas, an important increase in the quality of the SWNTs produced can result. Other nanotube-ceramic composites may be produced based on support materials comprising $Al_2O_3$, La-stabilized aluminas, MgO and $ZrO_2$, for example, which are suitable for a large variety of applications. When incorporated in polymeric matrices, these nanotube-ceramic composites may impart improved properties to the polymer. These properties include thermal conductivity, thermal stability (tolerance to degradation), electrical conductivity, modification of crystallization kinetics, strength, elasticity modulus, fracture toughness, and other mechanical properties. These, and other characteristics and properties of the present invention are described in further detail below.

The catalysts which provide the ceramic component of the nanotube-ceramic composite of the present invention are prepared in one embodiment by impregnating the support component (e.g., silica) with different metal solutions of specific concentrations. For example, the Co:Mo/SiO2 catalysts are prepared by impregnating various silica supports with aqueous solutions of cobalt nitrate and ammonium heptamolybdate to obtain the bimetallic catalysts of the chosen compositions (see U.S. Pat. No. 6,333,016, the entirety of which is hereby expressly incorporated by reference herein). The liquid/solid ratio is kept at incipient-wetness conditions, which is different for each support. The total metal loading is preferably from 0.1%-20% by weight. After impregnation, the catalysts are preferably first dried in air at room temperature, then in an oven at 120° C., and finally calcined in flowing air at 500° C.

SWNTs can be produced on these catalysts in different reactors known in the art such as fixed bed reactors, moving bed reactors or fluidized bed reactors. The fluidized bed reactor can be operated in both batch mode and continuous mode for example.

Figure 1:
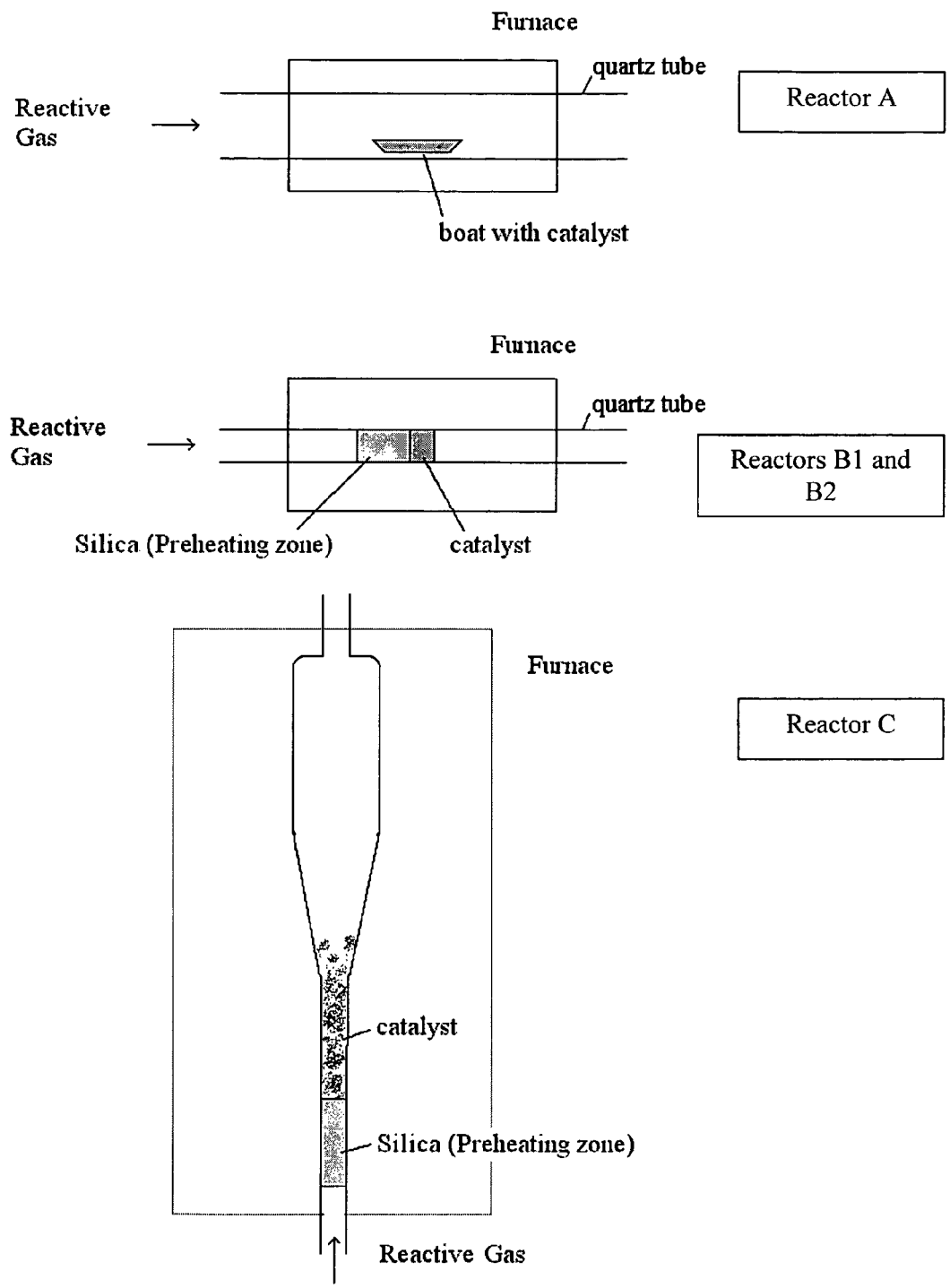
FIG. 1 shows a schematic drawing of several reactors which can be used to produce the products of the present invention.

The present work has used four lab-scale reactors to study and optimize the reaction conditions for the Co:Mo/SiO$_2$ series (FIG. 1). The first reactor (A) consisted of a horizontal quartz tube of 1 inch in diameter, in which a ceramic boat with 0.5 g of calcined catalyst was placed. This is a typical reactor configuration commonly found in the literature about carbon nanotube synthesis. The second and third reactors (B1 and B2) were typical quartz fixed-bed reactors of ⅛ and ¼ inch in diameter, respectively. Reactor B1 is loaded with 0.05 g of catalyst and it is considered a differential reactor when it is operated with a space velocity of 400,000 h$^{-1}$. Reactor B2 contained 0.5 g of the catalyst and was run with a space velocity of 67,000 h$^{-1}$. Finally, the fourth reactor (C) is a fluidized bed reactor.

In all cases, the catalyst is pre-reduced (e.g., by exposure to H$_2$ at 500° C.) before the catalyst is exposed to reaction conditions. Prior to exposure to a carbon containing gas (e.g., CO), the catalyst is heated in He up to the reaction temperature (700° C.-1050° C.). Subsequently, a carbon-containing gas or gasified liquid is introduced. After a given reaction period that ranged from 1 to 600 min, the reactor was purged with He and cooled down to room temperature.

For a continuous or semi-continuous system, the pretreatment of the catalyst may be done in a separate reactor, for example, for pretreatment of much larger amounts of catalyst whereby the catalyst can be stored for later use in the SWNT production unit. With this new methodology, a fluidized bed reactor can be kept operating continuously at the reaction temperature, thus eliminating the preliminary heating and cooling steps from the reaction process.

By varying the reaction conditions, the catalyst selectively produces SWNTs by the disproportionation of CO (decomposition into C and CO$_2$) in a preferred temperature range of 700-950° C. (see U.S. Ser. No. 10/118,834, which is hereby expressly incorporated by reference herein in its entirety). A synergism between Co and Mo is critical for the performance of this catalyst [4]. Separately, these metals are not effective; they are either inactive (Mo alone) or unselective (Co alone). The catalyst is only effective when both metals are simultaneously present on the silica support with an intimate Co—Mo interaction. The basis for selectivity of the catalyst has been studied.

Without wishing to be constrained by theory, it is believed that the selectivity towards SWNT production strongly depends on the stabilization of Co$^{2+}$ species by Mo oxide species as explained below. We found that the extent of the Co—Mo interaction is a function of the Co:Mo ratio in the catalyst and has different forms during the different stages of the catalyst life [4]. In the calcined state, Mo is in the form of a well-dispersed Mo$^{6+}$ oxide. The state of Co strongly depends on the Co:Mo ratio. At low Co:Mo ratios, it interacts with Mo in a superficial Co molybdate-like structure. At high Co:Mo ratios, it forms a non-interacting CO$_3$O$_4$ phase. During the subsequent reduction treatment in hydrogen, the non-interacting Co phase is reduced to metallic Co, while the Co molybdate-like species remain as well-dispersed Co$^{2+}$ ions. This Co—Mo interaction inhibits the Co sintering that typically occurs at the high temperatures required for the formation of carbon nanotubes. When large Co particles are present less desirable forms of carbon (mostly graphitic nanofibers) are produced. By contrast, when the Co clusters are so small that they are only composed by a few atoms, only SWNTs are produced [2, 4]. When metal atoms begin to agglomerate in the presence of gaseous CO, there is a nucleation period over which there is no growth of nanotubes. This nucleation involves the disruption of Co atoms from its interaction with Mo oxide when the latter becomes carbidic. This disruption is followed by surface migration leading to agglomeration into mobile clusters that continue to grow under the bombardment of CO molecules. Some of these molecules decompose and begin to rearrange (nucleate) until a favorable configuration (embryo) is reached, which triggers the formation of the nanotube. When this embryo is formed, the subsequent incorporation of carbon and SWNT formation would proceed at a fast rate, perhaps only controlled by mass transfer. As a result, one may conclude that the growth of each tube is limited by nucleation, and after nucleation is completed, it is controlled by mass transfer. For this reason, we have observed that the deposition of carbon on a solid catalyst continues for hours, although the growth of a single tube only takes milliseconds. The diameter of the tube is determined by the size of the embryo, therefore, control of nanotube diameter is possible by control of the size of the metal cluster under reaction conditions.

Improvement of SWNT Selectivity by Using Non-Microporous Silica as Support Material In systematic studies of SWNT growth under different reaction conditions, it has been demonstrated that mass transfer limitations are important in determining quality and yield of SWNTs. External mass transfer limitations can be minimized by adjusting the reaction conditions and modifying the reactor configuration. On the other hand, to minimize internal diffusion problems, the pore structure and particle size parameters of the catalyst particle can be adjusted. In general, small particles with larger pore sizes, or small non-porous particles can be used to reduce internal mass transfer limitations. However, the size of particles cannot be made much smaller without modifying the reactor design. Due to the high space velocity needed to keep the CO conversion low and the high surface velocity needed to minimize the external mass transfer limitation, excessively reducing the particle size of the catalyst would excessively increase the pressure drop in a fixed-bed reaction system. For this reason, a fluidized-bed reaction system is a preferred alternative. In such a reactor much finer particles can be used than in a fixed bed reactor. In some cases, particles as fine as powder can be used. In those cases, agglomeration and sticking to the walls and between the particles can be avoided by well-established techniques such as stirring and vibration, which break interparticle bonds and improve fluidizability. Preferably the particle size of the powders to be used fall under the type A category of the Geldart classification.

Another method that could be used to minimize diffusional limitations that may occur during the growth of carbon nanotubes is the in-situ fragmentation of catalyst particles that expose a higher surface area to the gas phase as the reaction proceeds. This is a typical method used in polymerization processes to improve and modify the reaction kinetics [25]. The in-situ fragmentation of the catalyst is obtained using a special support which might or might not need the use of special binders. This type of catalysts could be used in two ways. For example, as the nanotubes grow, the particles break exposing new surface and therefore increasing the total carbon yield obtained with such catalyst. Alternatively, a binder used in the support is disintegrated under the reaction conditions and a finer powder is generated in the reactor. Again the use of a finer powder may increase the final carbon yield.

We have observed that the microporosity of the silica support was responsible in part for the production of undesired forms of carbon in the resulting catalytic product. Mass transfer limitations inside these microspores together with a physical impediment for the growth of SWNTs inside pores, may be responsible for the reduction in nanotube quality. This hypothesis was verified by studying the influence of the maximum temperature reached during the catalyst preheating step. Two reactions were run at the same temperature (750° C.) for 2 hours using a Co:Mo (1:3)/silica-gel 60 (2% metal loading) catalyst. In one case, the usual procedure was used and the catalyst was preheated to 750° C. in He. In the second case, the catalyst was first preheated to 950° C. (thereby decreasing microporosity) and then cooled down to 750° C. The latest pretreatment resulted in a much better product with a quality parameter $\chi$ of 0.83 while for the first case $\chi$ was only 0.62 (the quality parameter $\chi$ increases as the quantity of amorphous carbon in the product decreases). However, no differences were observed in the diameter distribution of the SWNT produced and the carbon yield.

The structure of the silica is compromised at a temperature as high as 950° C. and therefore the micropores of the support tend to collapse. The average pre-treatment pore diameter of the silica-gel 60 is 6 nm. Single-walled nanotubes are not able to grow in pores that are much smaller than that and therefore those pores would lead to the formation of amorphous carbon. When the smallest pores collapse due to the preheating at 950° C., the production of amorphous carbon decreases and the quality of the material increases.

In order to verify that hypothesis and improve the performance of the catalyst, a different silica support with a different pore structure was studied. The new $SiO_2$ used was a precipitated silica "Hi-Sil®-210" (commercially available from PPG) which lacks microporosity.

A catalyst comprising Co:Mo (1:3) (2% metal loading) was prepared with the Hi-Sil®-210 silica and three experiments were conducted running the Boudouard reaction for 2 hours at 750° C., 850° C. and 950° C. using the same procedure as previously described. A fourth reaction was run also at 750° C. but used catalyst which had been pretreated with heating at 950° C. The results obtained for the quality parameter $\chi$ and the carbon yield are summarized in Table 1 and were somewhat different than the results obtained for the silica-gel 60. No significant increase was observed in either $\chi$ or the carbon yield when the pre-heating and reaction temperature was 750° C. or 850° C., while when the preheating and reaction temperatures were 950° C. there was an abrupt decrease of both parameters (to 0.80 and 2.0%, respectively). The second remarkable observation is that the quality of the SWNTs produced at 750° C. and 850° C. ($\chi$=0.97) was much higher than that one obtained using silica gel-60 even under the best operating conditions ($\chi$=0.83) (see previous discussion re: silica gel-60).

TABLE 1

Yield and quality of SWNT obtained using a Co:Mo(1:3(/SiO$_2$ - Hi-Sil ® catalyst in Reactor B2. Reaction run for 2 hours at 5.8 atm.

| Catalyst | Preheating Temperature (° C.) | Reaction Temperature (° C.) | 1-D/G | Yield (Wt %) |
|---|---|---|---|---|
| Co:Mo(1:3)/SiO$_2$ - Hi-Sil ® (2% metal loading) | 750 | 750 | 0.97 | 9.3% |
| Co:Mo(1:3)/SiO$_2$ - Hi-Sil ® (2% metal loading) | 850 | 850 | 0.97 | 10.0% |
| Co:Mo(1:3)/SiO$_2$ - Hi-Sil ® (2% metal loading) | 950 | 950 | 0.80 | 2.0% |
| Co:Mo(1:3)/SiO$_2$ - Hi-Sil ® (2% metal loading) | 950 | 750 | 0.97 | 11.4% |

The results of the preheating treatment were also important. The great increase in $\chi$ reported before using the silica gel-60 as the catalyst support when the catalyst was preheated to 950° C. was not observed when the silica with low microporosity (Hi-Sil® silica) was used.

These results indicate that the microporosity of the silica gel-60 was responsible at least in part for the formation of amorphous carbon that lowered the selectivity towards SWNTs (i.e., decreased $\chi$). The increase in the quality parameter $\chi$ when the reaction temperature increased was related to the collapse of micropores due to the higher temperatures. A similar quality improvement observed when the catalyst was preheated to 950° C. and the disappearance of this temperature effect when Hi-Sil®-210 silica (with low microporosity) is used, strongly supports this hypothesis.

Interestingly, another difference observed with the Hi-Sil®-210 silica was that the carbon yield obtained at a reaction temperature of 950° C. was very low (just 2 wt %). Moreover, the quality (i.e., selectivity) (x=0.8) was also much lower than the $\chi$ obtained at 750° C. and 850° C. These observations indicate a higher rate of deactivation of the catalyst due to sintering. The lower surface area of this support probably makes the catalyst more exposed to the sintering effect.

Figure 2:
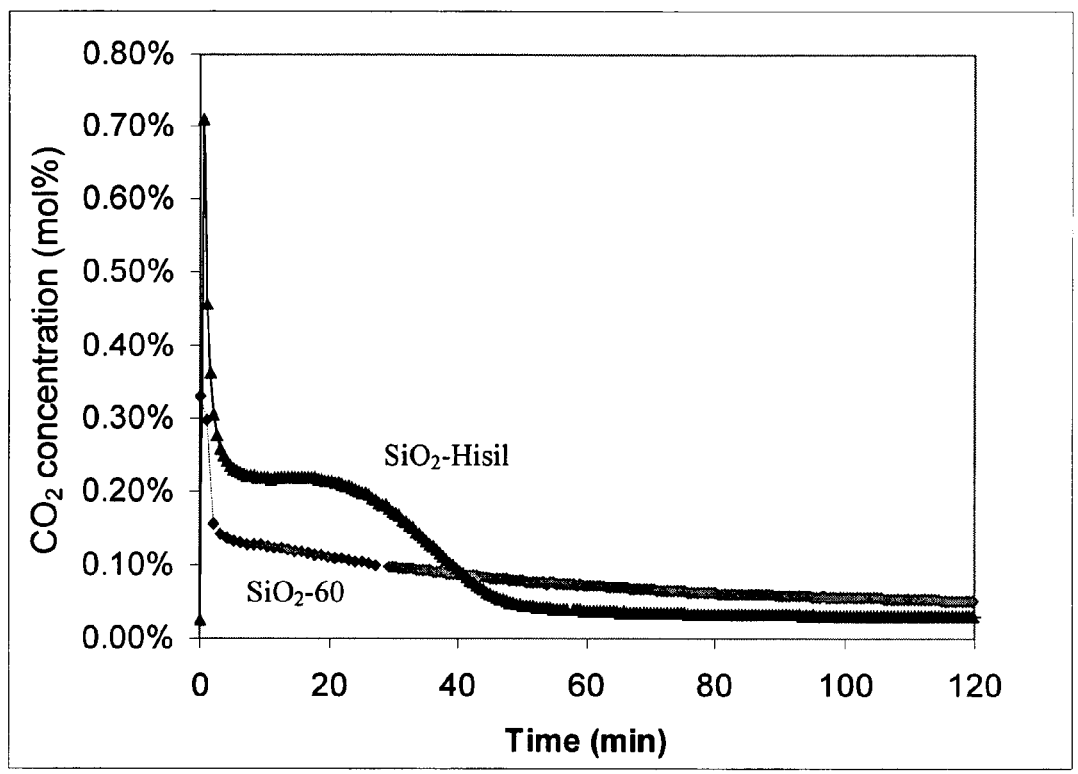
FIG. 2 is a graph showing the concentration of $CO_2$ downstream of reactor B2 as a function of reaction time for two Co:Mo (1:3)/silica catalysts (2% metal loading) with two different silica compositions (silica gel-60 and Hi-Sil®-210). Reaction run at 850° C. with a space velocity of 67,000 $h^{-1}$.

It is important to note that when the reaction was run at 750° C. and 850° C. for 2 hours, the carbon yield was slightly higher than when silica gel-60 was used. However, similar yields had been obtained with Hi-Sil®-210 for longer reaction times, showing that indeed the overall reaction rates are different in both cases. Moreover, when the $CO_2$ produced was followed by online mass spectroscopy (see FIG. 2), it was observed that the reaction rate using Hi-Sil®-210 was at least twice as fast during the first 30 minutes of reaction than when silica gel-60 was used. Afterwards, the production of $CO_2$ slows down sharply and becomes lower than for the case with the silica gel-60 catalyst. This observation indicates that the primary period of the production of SWNTs is during the first 30 minutes of reaction.

These observations provide strong evidence that the internal diffusion is limiting the overall reaction rate for the production of SWNTs. Since, as mentioned before, the growth of the SWNTs themselves occurs in milliseconds, the nucleation step of the nanotubes is the one that is being limited by the internal diffusion. Among the different phenomena that the nucleation step involves, the one that may be more likely affected is the release of the cobalt clusters.

Katura plots and Raman spectra were used to study the relationship between diameter distribution and reaction temperature for production of single-walled carbon nanotubes.

Raman spectra were obtained using 633 nm and 514 nm lasers. Reactions ran for two hours in reactor B2 using the Co:Mo (1:3)/Hi-Sil® silica with 2% metal loading. The reaction was run at 5.8 atm and at 750° C., 850° C., and 950° C. When silica gel-60 is used as a support, as the reaction temperature is increased, the SWNTs produced have larger diameters and the diameter distribution becomes broader. For instance, the average diameter for SWNTs produced at a reaction temperature of 750° C. is about 0.9 nm, while SWNTs produced at reaction temperatures of 850° C. and 950° C. have diameters of about 1.1 nm and about 1.4 nm, respectively.

Finally, it was observed that similar results are obtained when other non-porous silicas (e.g., fumed silicas Aerosil® 380 and Aerosil® 90 (commercially available from Degussa Corp.) and Cab-o-sil® (commercially available from Cabot Corp.)) are used as the catalyst support.

The nanotube-ceramic composites described herein may be formed from support materials comprising fumed silica nanoparticles (e.g., 10-20 nm in diameter), precipitated silica, silicas including silica gel, alumina ($Al_2O_3$), La-stabilized aluminas, MgO (magnesium oxide), mesoporous silica materials including SBA-15 and Mobil Crystalline Materials (including MCM-41), zeolites (including Y, beta, KL and mordenite), and $ZrO_2$ (zirconium dioxide). The catalysts in one embodiment, comprise cobalt and molybdenum (or other catalytic metals) and make up, preferably up to 20% wt of the ceramic catalyst particle. The ceramic catalyst may further comprise chromium, for example, or other metals including Fe, Ni, or W, or others as listed in U.S. Pat. No. 6,333,016, or 6,413,487 or in U.S. Ser. No. 60/529,665, each of which is hereby expressly incorporated herein in its entirety. Each nanotube-ceramic composite preferably comprises up to 50% carbon by weight, for example, 1 to 10% of the total weight of the composite. Preferably at least 50% of the SWNTs have outer diameters of 0.7 nm to 1.0 nm, more preferably at least 70%, and still more preferably at least 90%. In another embodiment at least 50% of the SWNTs have outer diameters of 1.0 nm to 1.2 nm, more preferably at least 70%, and most preferably at least 90%. In yet another embodiment, at least 50% of the SWNTs have outer diameters of 1.2 nm to 1.8 nm, more preferably at least 70%, and most preferably at least 90%.

The support materials upon which the catalytic metals are disposed to form the metallic catalytic particles are not carbon nanotubes. The carbon nanotubes are produced only after the metallic catalytic particles are exposed to reaction conditions.

Utility

The carbon nanotube-catalyst support compositions produced herein can be used, for example as, electron field emitters, fillers of polymers to modify mechanical and electrical properties of the polymers, fillers of coatings to modify mechanical and electrical properties of the coatings, fillers for ceramic materials, and/or components of fuel-cell electrodes. These of course are merely examples of how the compositions of the invention can be used and use is not limited to them. The present used are described in further detail below.

Uses in Field-Emission Displays

Single-walled carbon nanotubes have attracted considerable attention as field emitter materials due to their superior emission characteristics, high chemical stability, and outstanding mechanical strength. Even though a great deal of effort is being done around the world to bring nanotube applications to fruition, only a few have shown real potential. Among them, field-emission displays (FEDs) will be one of the first commercial applications. FEDs are characterized by superior display performances such as fast response time, wide viewing angles, wide operation temperatures, cathode ray tube (CRT) like colors, ultra-slim features, low-cost and low-power consumption. FED technology is one of the most promising approaches for direct view displays larger than 60" diagonal [5]. At present, there are no well-developed technologies for growing in-situ vertically aligned nanotubes over a large area of glass substrates at low temperatures. An alternative technology is the use of nanotubes produced separately and later deposited on the cathode by techniques such as the screen-printing method. The deposition of a mixture of nanotubes and dielectric nanoparticles (DNPs) leads to much improved emission characteristics [e.g., see Ref. 6 and U.S. Pat. Nos. 6,664,722 and 6,479,939]. This development makes a perfect combination with the high quality nanotube-ceramic composites described herein. The nanotube-ceramic composites are particularly suitable for this application since the $SiO_2$ is in the form of (dielectric) nanoparticles and have shown excellent results in this regard (see Example I).

Figure 3:
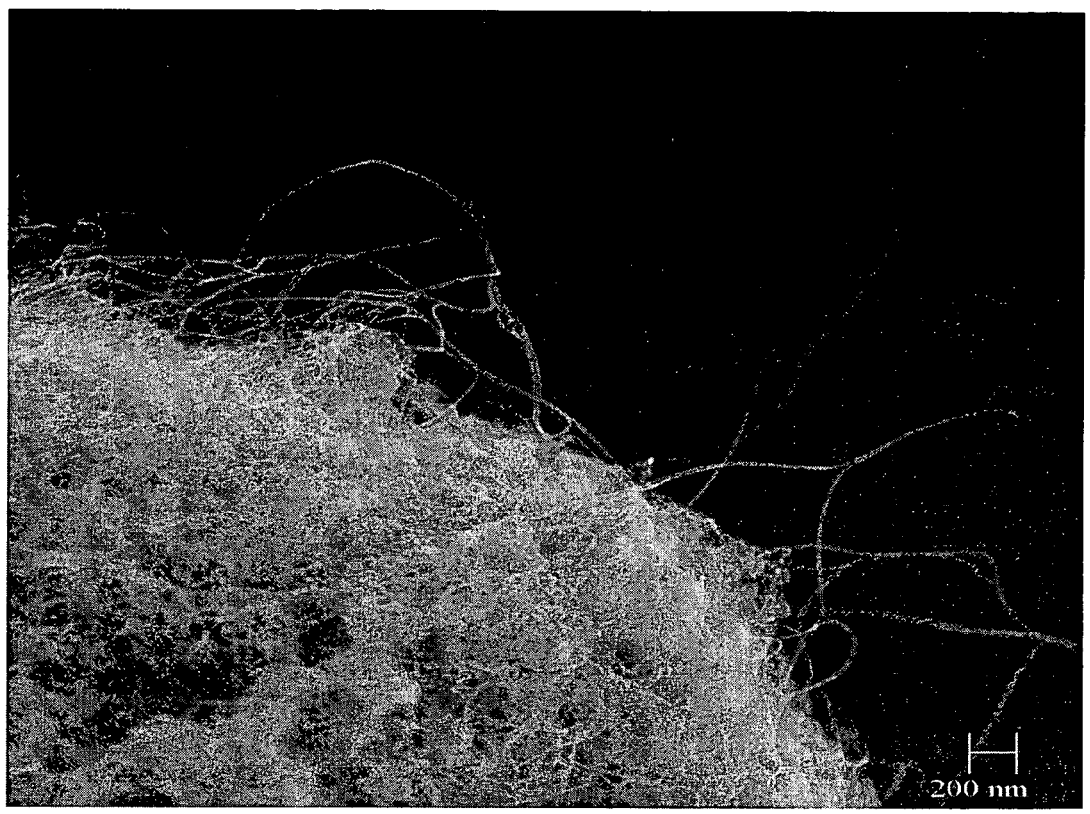
FIG. 3 is a scanning electron micrograph of a nanotube-ceramic composite product showing bundles of SWNTs which remain intercalated among silica particles.

The nanotube-ceramic composites produced herein are shown in one embodiment in FIG. 3. The nanosized particles of the silica support are physically spacing the bundles of nanotubes apart, which might be beneficial for field emission applications. The nanotube-ceramic composites of the present invention have at least two advantages over a purely physical mixture of purified nanotubes and $SiO_2$.

In particular, the efficiency with which the silica particles space the nanotube bundles apart is much higher, and the cost of the presently described composites is orders of magnitude lower than purified single-walled carbon nanotubes.

Uses as Filler to Modify Mechanical and Electrical Properties of Polymers

Thermoplastic and thermosetting materials have been filled with particulate reinforcements such as $SiO_2$ to improve mechanical, thermal and chemical properties. When this reinforcement material is in the nanoscale size, the enhancement of such properties is noticeable higher. For this reason, fumed silica, which is available with 10-20 nm particle size, is commonly used as a reinforcement of PVC, silicones, acrylics [7-11] and vulcanized rubbers [12]. It is also used as component material for dental filling [13], electronic packaging [14], and thickeners of paints and coatings [15].

Single wall carbon nanotubes show unmatched electrical and mechanical properties, which make them good candidates to be incorporated into polymer matrices in order to obtain high-strength, conductive polymers. However, to capitalize on the properties of carbon nanotubes, a good dispersion of the nanotubes in the polymer matrix is needed. Ideally, this dispersion should contain individual nanotubes embedded in the polymer matrix. However, although many scientists are working in this area, no technique developed until this moment has been entirely successful in achieving this order of dispersion.

Use of the nanotube-ceramic compositions described herein as polymer filler provides the advantages of both nanosized silica and SWNTs. In addition, the dispersion techniques that have been developed for the incorporation of $SiO_2$ into different polymer matrices can still be applied to the nanotube-ceramic composition, therefore increasing, at the same time, the dispersion of the SWNTs. This dispersion can be carried out either in the molten state of the polymer or in solutions of the dissolved polymer in solvents of varying reactivity. Reactive solvents can be low-molecular weight thermo-setting resins which blend with the matrix polymer and may improve the processing conditions (e.g., blend viscosity and processing temperature). Moreover, the surface chemistry of the $SiO_2$ can be easily changed for its incorporation in a specific polymer matrix by generating grafting sites, which can be used as anchoring sites for enhancement of polymer-filler adhesion and/or sites for starting in-situ polymerization.

Uses as Catalysts for In-Situ Polymerization

A novel technique that we have invented for use in maximizing the dispersion of SWNT in polymer matrices is "in-situ-polymerization" (see U.S. Ser. No. 10/464,041, the entirety of which is hereby expressly incorporated by reference herein in its entirety). We have shown that the properties of the SWNT-polymer composites obtained by this technique are much better than those obtained for merely a physical mixture of the same polymer and the nanotubes [16, 17]. A method that we used to incorporate and disperse SWNT in polymers was a technique called mini-emulsion polymerization, a well-established method for producing polymer particles with very narrow size distributions. This process has the advantage of requiring substantially less surfactant to stabilize the reacting hydrophobic droplets inside the aqueous medium than in conventional emulsion polymerization. It also eliminates the complicated kinetics of monomer transfer into micelles that takes place in the conventional emulsion polymerization. SWNT-filled polystyrene (SWNT-PS) and styrene-isoprene composites prepared by this method showed distinctive physical features such as: uniform black coloration; high solubility in toluene as well as in tetrahydrofuran (THF); and semiconductor to ohmic electrical behavior.

In-situ-polymerization techniques can also be used to obtain good dispersions of the presently claimed nanotube-ceramic composites in different matrices. Moreover, these nanotube-ceramic composites can be selectively tailored for in-situ-polymerization of specific polymers by adding an active agent to either the composite or the bare catalyst before the nanotubes are produced. As an example we have developed a $SWNT/SiO_2$ composite which has been doped with chromium to make it effective in in-situ-polymerization of ethylene. Polyethylene produced using Phillips $Cr/SiO_2$ catalysts represents 20% of the worldwide production of polyethylenes [18]. Since this catalyst needs to be activated under CO at high temperatures to be effective for polymerization [19], the present nanotube-ceramic composites doped with chromium can be already active for ethylene polymerization after the growth of the nanotubes by CO disproportionation. In fact, during the growth of SWNT, the catalyst is treated under pure CO at high temperatures. The chromium-doped nanotube-ceramic composite comprises an effective polymerization catalyst.

Uses as Filler for Ceramic Materials

Ceramics are traditionally hard but easy to break materials. Carbon nanotubes added to a ceramic material can greatly enhance its resistance to fracturing as well as increasing thermal and electrical conductivity of the ceramic. These new materials could eventually replace conventional ceramics or even metals in countless products. For example, scientists have mixed alumina powder with single-wall carbon nanotubes and then forced the particles together with a combination of heat, pressure, and pulses of electric current. Called spark-plasma sintering, the method operates at lower temperatures than the conventional sintering technique used in previous attempts to make nanotube-reinforced composites. When the researchers made a ceramic with nanotubes as 5.7% of its material, the product's fracture toughness increased to more than twice that of a pure-alumina ceramic. With carbon nanotubes at 10% of the volume, the ceramic's toughness nearly tripled.

Due to the high-price of single-wall carbon nanotubes, it has been thought that the earliest uses of ceramics made with these materials would probably be applications in which cost is a secondary concern, such as in space vehicles and medical devices. However, the nanotube-ceramic composites described herein may be easily used to reinforce these ceramics and further, because of their low cost, may make possible their use in wider range of applications.

Uses in Fuel Cell Electrodes

The current drive to reduce the use of fossil fuels due to their environmental and geopolitical impact have given fuel cells an extraordinary push as alluring alternatives to combustion engines. The basic parts of a fuel cell are an ion conducting electrolyte, a cathode, and an anode. A fuel such as hydrogen (or methanol) is brought into the anode compartment where it releases electrons and forms protons, which diffuse to the cathode compartment, where they react with oxygen and consume the electrons. The electrolyte acts as a barrier for gas diffusion, but allows ion transport.

Among different types of fuel cells, polymer electrolyte membrane (PEM) fuel cells are generally preferred for most portable systems. They operate by transporting hydronium ions through hydrated regions of a sulfonated polymer. Due to the high conductivity of the membranes they can operate at low temperatures (<100° C.). Moreover, recent progress has allowed the use of proton-conducting membranes such as Nafion (an ionomer)+silica+PW (a heteropolyacid based on phosphorus tungsten), which can operate 'water-free' and at low temperatures. In parallel with the development of electrolyte membranes, great attention is being paid worldwide to the development of improved electrodes to enhance reaction kinetics, decrease Pt loadings, and increase the tolerance to CO poisoning.

The CO poisoning of the anode is a serious problem in PEM fuel cells. Some promising results have been obtained by alloying Pt with Ru, Mo, Sn, or WOx. Several substrates have been investigated to maximize the dispersion of Pt (an electrocatalyst) and the effectiveness of the electrodes. For example, Bessel et al. [20] have investigated graphite nanofibers as support for platinum particles fuel cell electrodes. They compared various types of graphite nanofibers with Vulcan carbon (XC-72). Catalysts consisting of 5 wt. % platinum supported on graphite nanofibers were found to exhibit activities comparable to that displayed by about 25 wt. % platinum on Vulcan carbon. Furthermore, the graphite nanofiber supported metal particles were observed to be significantly less susceptible to CO poisoning than the traditional catalysts. This improvement in performance was ascribed to specific crystallographic orientations that Pt would adopt when dispersed on the graphite nanofibers. Similarly, Rajesha et al. [21] have found that a combination of Pt and W supported on multi-walled carbon nanotubes results in much more efficient electrodes for methanol fuel cells than those supported on Vulcan carbon, which was attributed to a much higher dispersion of the Pt metal.

All these results indicate that our single-walled carbon nanotubes of the nanotube-ceramic composite described herein (or the SWNT alone), with a much higher surface area, and more perfect structure than multi-walled carbon nanotubes, or graphite nanofibers should be even more efficient. Also, the higher electrical conductivity of SWNT compared to other forms of carbon will be a favorable characteristic in the final electrode.

Uses in Solar Cells

Researchers from Cambridge University's engineering department [22] have developed photovoltaic devices that, when doped with single-wall carbon nanotubes, perform better than undoped photovoltaic devices. The nanotube diodes were made by depositing organic films containing SWNTs on to glass substrates coated with indium-tin oxide (ITO). Aluminium electrodes were then thermally evaporated under a vacuum to form a sandwich configuration. The interaction of the carbon nanotubes with the polymer poly(3-octylthiophene) (P3OT) allows excitons generated by light in the polymer to dissociate into their separate charges and travel more easily.

The operating principle of this device is that the interaction of the carbon nanotubes with the polymer allows charge separation of the photogenerated excitons in the polymer and efficient electron transport to the electrode through the nanotubes. The electrons travel through the nanotube length and then hop or tunnel to the next nanotube. This results in an increase in the electron mobility and balances the charge carrier transport to the electrodes. In addition, the researchers found that the composite's conductivity is increased by a factor of 10, indicating percolation paths within the material. This doping of P3OT polymer diodes with SWNTs also improves the device's photovoltaic performance, increasing the photocurrent by more than two orders of magnitude and doubling the open-circuit voltage.

The presently-described nanotube-ceramic composites can be very useful for this application since a more controlled film preparation and polymer doping is required for further improvements in the performance of these devices. In particular, the presently-described nanotube-ceramic composites can help in achieving the required dispersion of SWNT in the polymer matrix used in this type of device.

Further, the cost advantage of the present compositions make their use in solar cells economically favorable.

Example

Work was conducted to determine the nanotube diameter distribution and quantity which optimized the performance of the nanotube-ceramic composites in field emission devices.

SWNTs obtained at higher temperatures show a broader diameter distribution centered at large diameters but bundles of smaller size [2].

A similar increase in diameter is observed when $H_2$ is added in small concentrations to the carbon source fed to the reactor. However, if the concentration of $H_2$ is too high, carbon nanofibers start to form and the process loses selectivity toward SWNT. For example, with pure CO, SWNTs of small diameter (0.8 nm OD) are produced; with 3% $H_2$ in CO the diameter increases (1.3 nm OD); with 10% $H_2$ in CO mostly multi-walled nanotubes (19 nm OD) are produced.

Figure 4:
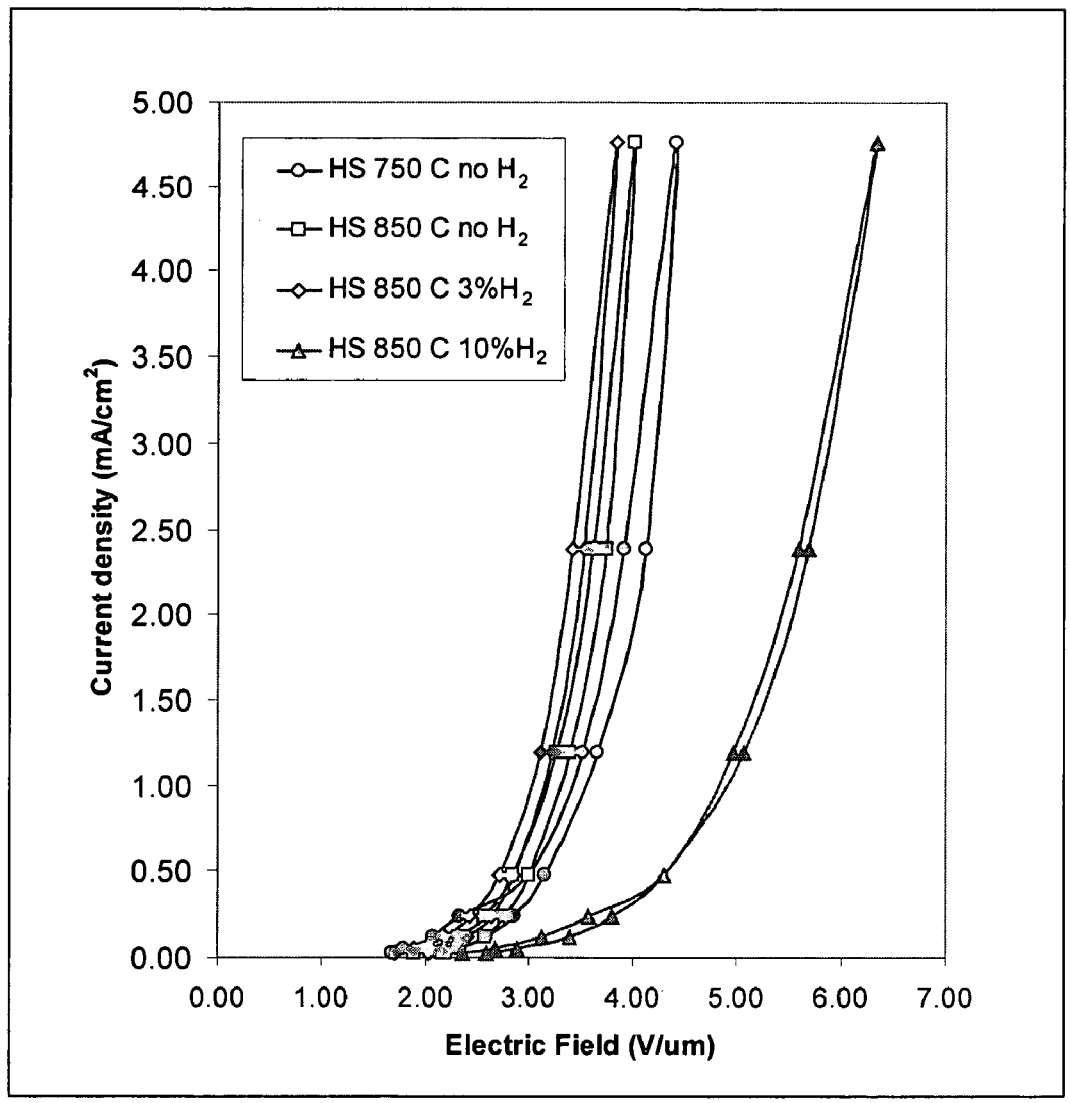
FIG. 4 is an I vs. V graph showing curves for composites prepared at different temperatures and $H_2$ concentrations.

In parallel, the field emission characteristics of this series of samples were studied to determine the effect of SWNT diameter distribution and quality of the SWNT material. The I vs. V curves for the corresponding nanotube-ceramic composites of the three samples are shown in FIG. 4. For the best performance of a field emission device, it is obvious that higher current densities at lower electric field are desired. With this concept in mind, it is clear that the composite with the best performance was that obtained at 850° C. and 3% $H_2$. The sample produced at 850° C. with no $H_2$ followed this one in performance, followed by the sample produced at 750° C.

In all cases, the samples showed good stability, meaning little deterioration in the sample after reaching a current density of almost 5 mA/cm$^2$. This is observed by the low hysteresis of the I vs. V curves The influence of the dielectric structure on the field emission emission characteristics of the nanotube-ceramic composites was also studied.

For this purpose a series of different composites was prepared using different silica supports for the catalyst particle. The silicas include a silica gel 60 with an average pore diameter of 60 Å, a Hi-Sil®-210 silica with no microporosity and a surface area of 250 m$^2$/g, and two different aerosols (Aerosil® 90 and Aerosil® 380) with specific surface areas of 90 and 380 m$^2$/g and an average particle size of 20 and 7 nm, respectively. A series of MCM-41 were also specially synthesized to try to improve the field emission. Due to the highly ordered pore structure but the lower selectivity towards SWNT during the reaction process that this material showed, the composites provided a poorer field emission performance.

Figure 5:
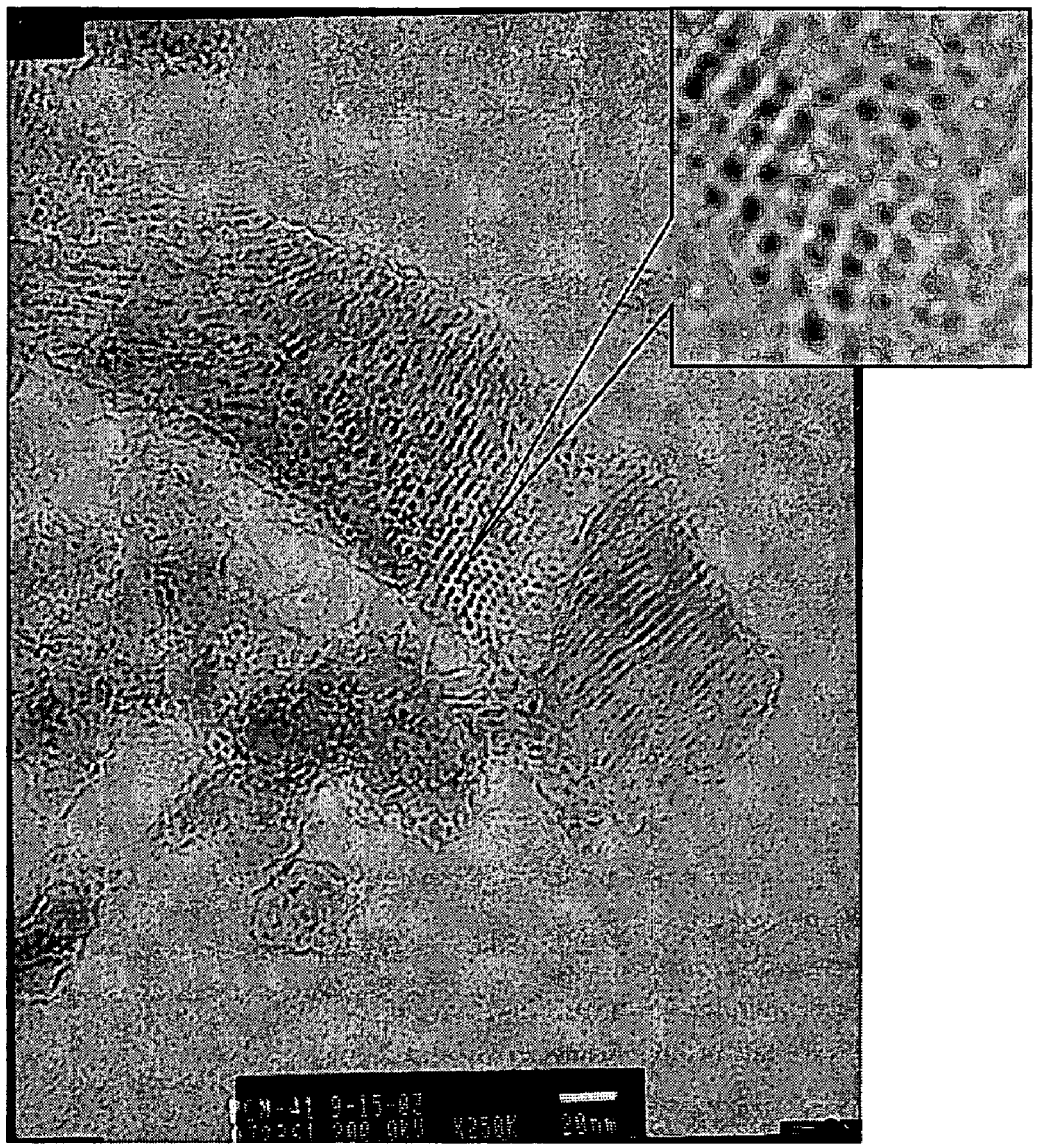
FIG. 5 is a TEM image of prepared MCM-41 support material.

The MCM-41 silicas were prepared by mixing 100 g of CTAOH with 50 g of tetramethylammonium silicate and stirred for 30 minutes. Then 12.5 g of Hi-Sil®-x was added to the solution, stirred for five minutes, and poured into an autoclave. The autoclave was placed in oven at 150° C. for 48 hours. Upon removal, the autoclave was allowed to cool to room temperature. The solid was vacuum filtered with a Büchner funnel, washed with nanopure water, and dried under ambient conditions. The predried solid was calcined in air by heating from room temperature to 540° C. over a twenty-hour period then soaked for two hours. The calcined samples were designated as MCM-41-210, MCM-41-233, and MCM-41-915 indicating the different Hi-Sil® silicas used to start with. FIG. 5 shows a TEM picture of the synthesized MCMs. The picture shows regular hexagonal array of uniform channels, which is typical for MCM-41. The average pore diameter in all the samples is about 40 Å.

Figure 6:
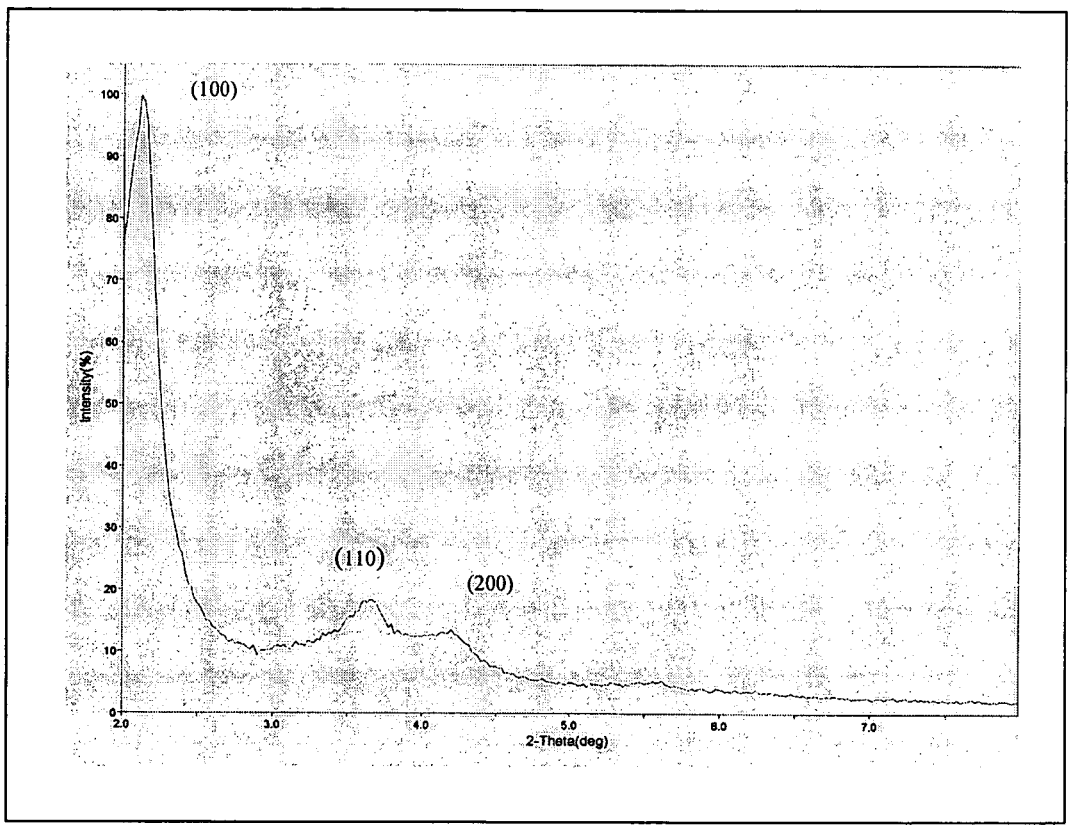
FIG. 6 is an XRD spectrum of MCM-41 prepared as in FIG. 5.

We also characterized the MCM samples using X-ray Diffraction Spectra (XRD). The XRD patterns (FIG. 6) indicate that the samples exhibited hexagonal structures with a high degree of structural ordering, since all of the spectra featured three of (hkl) interplanar spacing associated with hexagonal lattice structure. The peaks seen in the spectra are narrow (100) peaks and well separated (110) and (200) reflections. The cylindrical unit cell parameter ($a_o$) is equivalent to the interplanar spacing of $d_{100}$, and the hexagonal unit cell parameter ($a_o$) is equivalent to the interplanar spacing of $d_{100}$ (2/√3). From the interplanar spacing, the pore diameter of the samples was determined to be around 45 Å, which is in good agreement with the TEM data.

Figure 7:
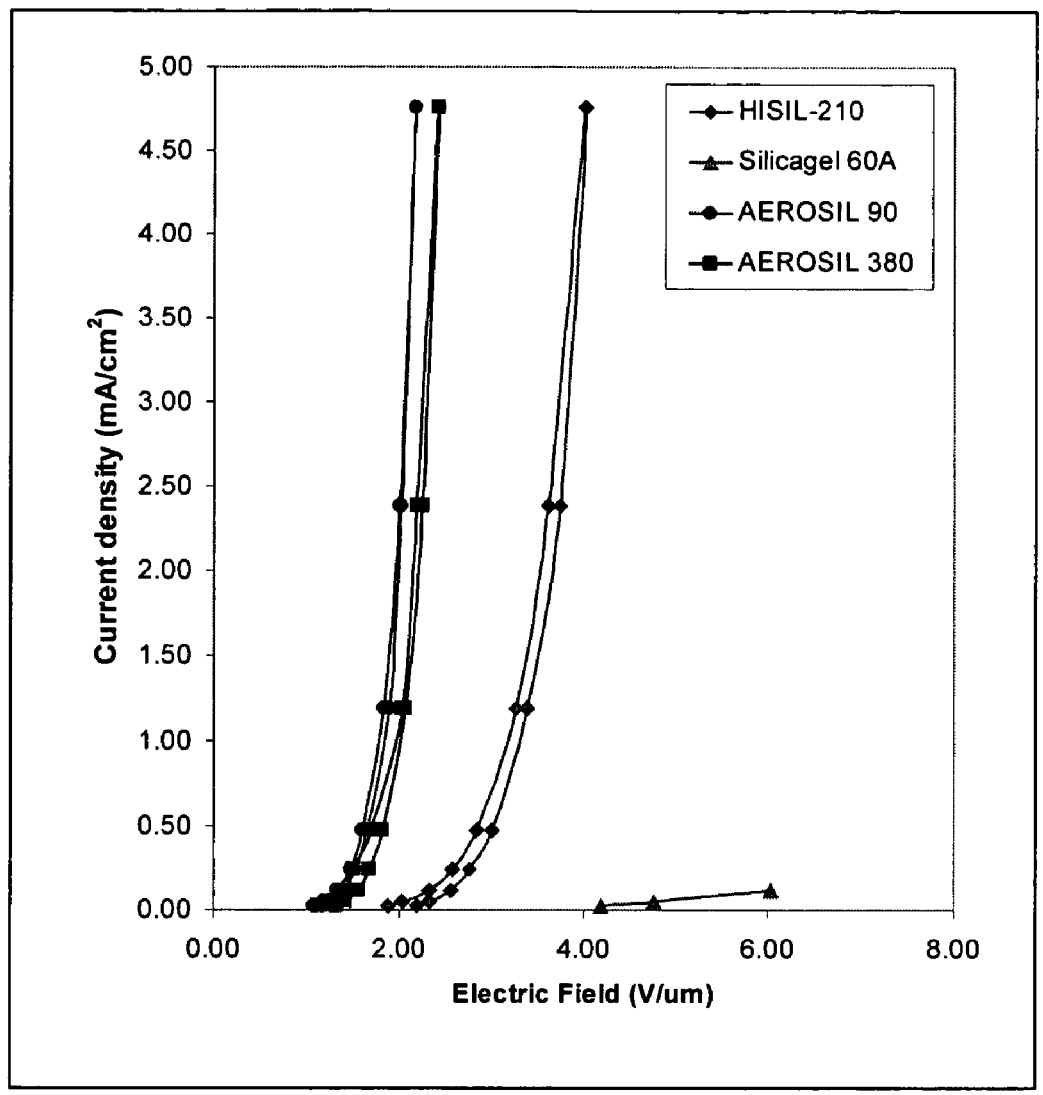
FIG. 7 is an I vs. V graph showing curves for nanotube-ceramic composites prepared using various silica supports.

For the study of the structure of the support, the same Co:Mo catalyst was prepared using the different supports and the nanotube-ceramic composites were prepared under reaction conditions at a temperature of 850° C. In this case, no hydrogen was included in the feed. The I vs. V curves for these samples are observed in FIG. 7. In this case, the samples with the best field emission performance were those with the Aerosil® silicas, which are fumed silicas with an average particle size in the nano-scale range. The Aerosil® 90 sample, which showed a slightly better performance than the Aerosil® 380, has an average particle diameter of 20 nm, while the Aerosil® 380 has an average particle size of 7 nm. The small difference in the field emission characteristics of these two samples appears to indicate that the average particle size of the fumed silica always in the 7-20 nm range is much less important than the general structure of the support. The sample made with the Hi-Sil®-210 silica needed an electric field of 1.6 V/μm more (4.02 V/um against 2.41 V/μm) than the Aerosil® 380 sample to achieve the same (4.76 mA/cm$^2$) current density. In this case, the structure of this silica is completely different since Hi-Sil®-210 is a precipitated silica with a specific surface area of 150 m$^2$/g. One important characteristic of the Hi-Sil®-210 silica is its absence of microporosity. On the other hand, the silica gel 60 is highly microporous. The nanotube-ceramic composite prepared using this silica, had poor field emission performance and did not achieve current densities higher than 0.12 mA/cm$^2$. Similarly, the MCMs prepared, which have pore diameters in the order of 40 Å showed the same poor behavior. The lower selectivity towards SWNT of these samples as observed by the lower quality parameter (1-D/G) obtained from Raman spectra, appears to be the reason for this phenomenon.

Figure 8:
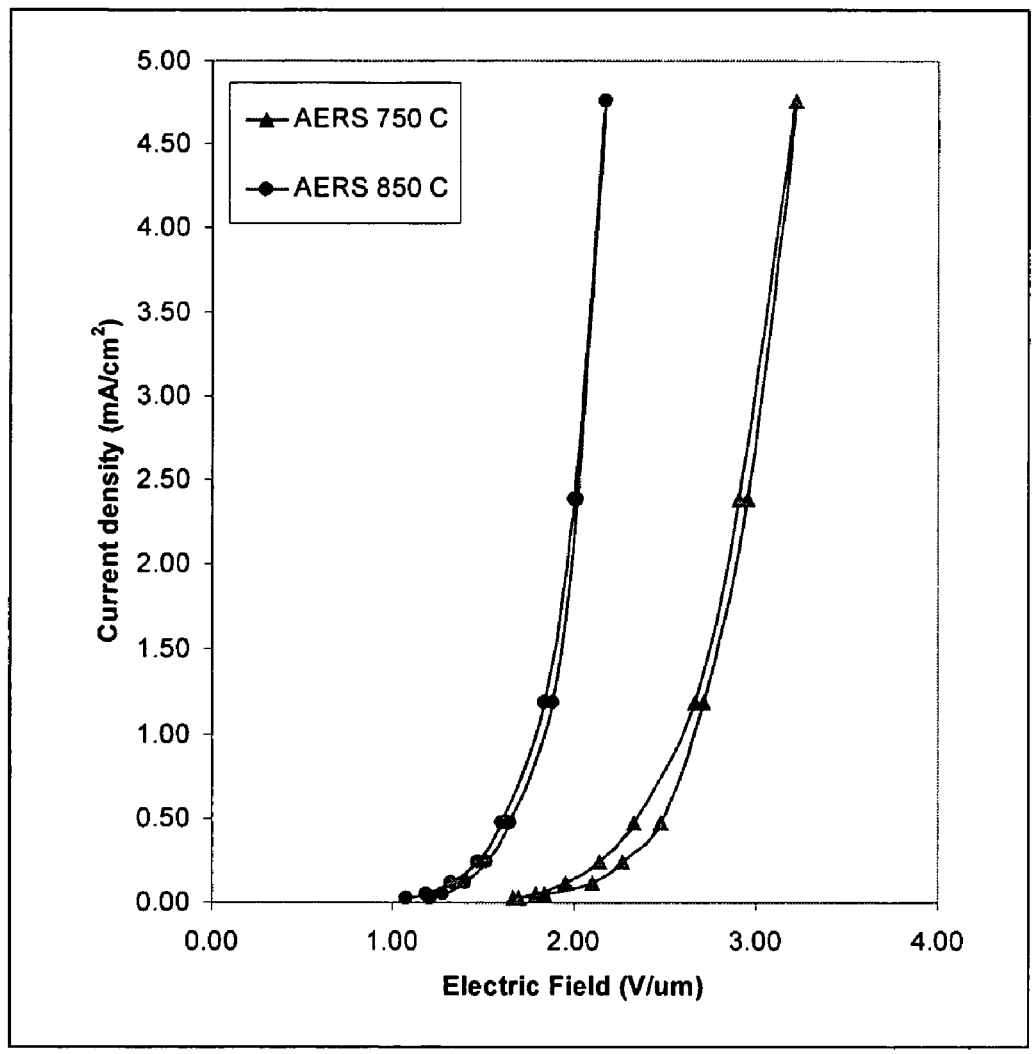
FIG. 8 is an I vs. V graph showing curves for Aerosil 380 nanotube-ceramic composites synthesized at 750° C. and 850° C.

The Aerosil® composites showed excellent performance achieving the targeted current density at very low electric field. To verify the correspondence of field emission with synthesis temperature described above using the Hi-Sil®-210 silica, another Aerosil® composite was prepared, and the nanotube-ceramic composite was synthesized at 750° C. The comparison with that obtained at 850° C. is showed in FIG. 8. Again, the same trend is observed (better performance with higher synthesis temperatures). The composite produced at 850° C. had a much better performance than that produced at 750° C.

Another aspect of the Aerosil® composite synthesized at 850° C. that is important to note is the extremely low hysteresis observed in its I vs. V curve. No other material tested herein had shown such performance, with almost no deterioration of the sample after achieving current densities of almost 5 mA/cm$^2$.

Figure 9:
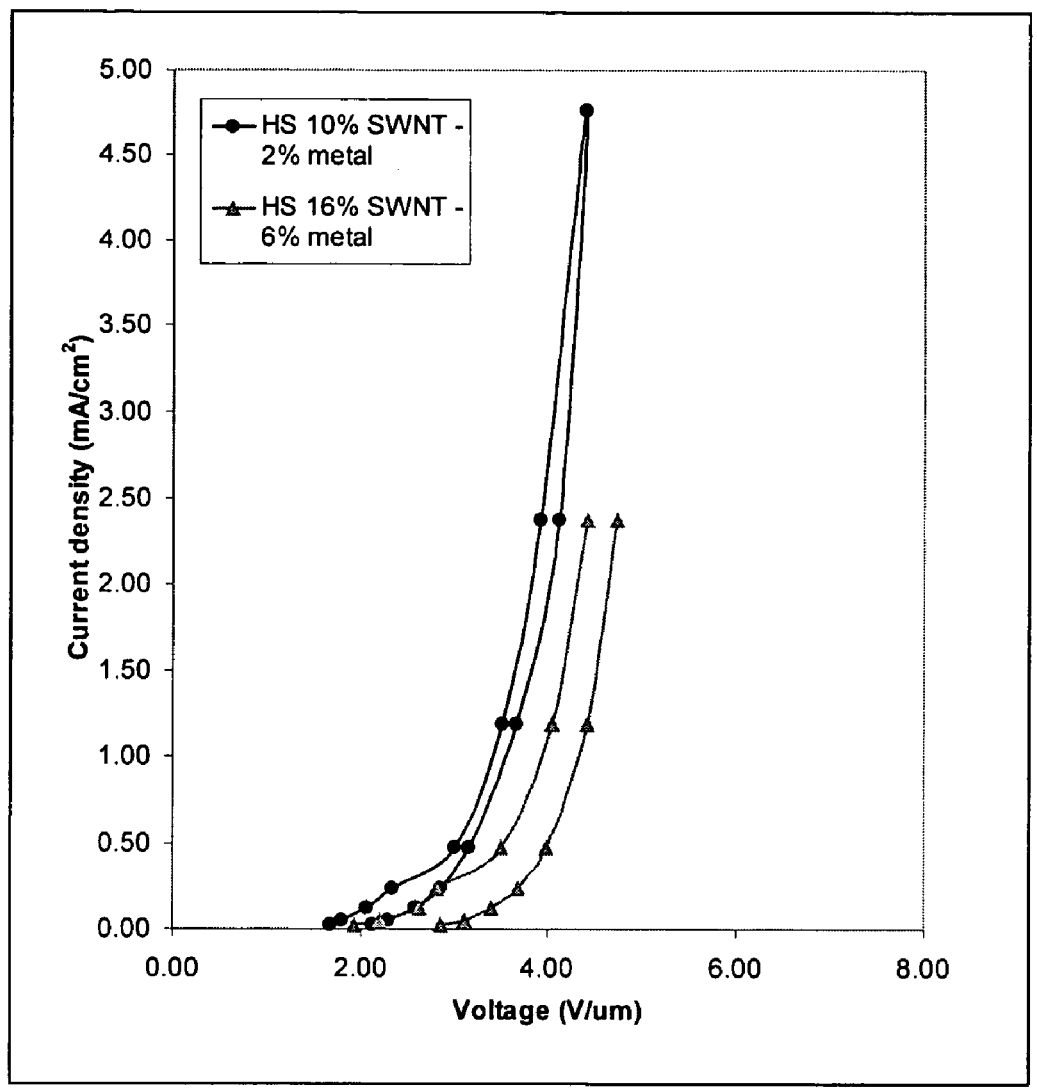
FIG. 9 is an I vs. V graph showing curves for two nanotube-ceramic composites with different metal loadings (2% and 6%).

Finally, the effect of the carbon content in the SWNT composite on the field emission performance of the material was studied. To accomplish this, different methods of changing the carbon/silica ratio were used. The first one was to increase the carbon yield during the synthesis of the SWNT of the nanotube-ceramic composite. This was achieved by increasing the metal loading on the original catalyst particle from 2% to 6%. With this, two composites, one containing 10% SWNT and the other 20% SWNT were compared. Although earlier studies showed that an optimal performance was achieved by a 50% SWNT/50% dielectric material mixture, the I vs. V curves of these two samples (FIG. 9) showed that the material with 16% SWNT behaved worse than that the material with only 10% SWNT. The yield does not increase linearly with the metal content of the catalyst and therefore the efficiency of the metal decreases as shown in Table II. For instance, for two samples with 2 wt % and 10 wt % metal, the metal efficiencies were 500 wt % and 200 wt %, respectively. Although even in the best case the efficiency is low and only 147 moles of carbon are produced per mol of Co that is the active species, the efficiencies obtained using the present method of synthesis are much higher than those obtained by any other method. For example, the highest efficiency reported by Ci, et al. [23] using the floating catalyst method with acetylene as the carbon source and Fe as the active catalyst was 3.25 moles of carbon per mol of Fe. Similarly, the C/Fe ratio in the HipCO® method is 10/1 [24].

Table II also shows the quality parameter $\chi$ (1-D/G) obtained from Raman spectra (514 nm laser) of the product obtained using the different catalysts (2 wt %, 6 wt % and 10 wt % metal loading). Although there is a clear trend where the quality parameter decreases as the metal loading is increased, it is important to remark that the quality of the SWNT does not differ much in this metal loading range and should not be a factor for the difference in field emission.

TABLE II

Quality parameter 1-D/G, carbon yield and Metal efficiency as function of metal loading on a Co:Mo(1:3)/SiO$_2$-Hi-Sil ® catalyst series. Reaction run at 750° C. and 5.8 atm.

| Total metal loading (wt %) | 1-D/G | Yield (wt %) | Efficiency ($g_{carbon}/g_{metal}$) | ($mol_{carbon}/mol_{co}$) |
|---|---|---|---|---|
| 2% | 0.947 | 10% | 500% | 147 |
| 6% | 0.946 | 16% | 272% | 80 |
| 10% | 0.940 | 19% | 192% | 56 |

In conclusion, the increase in metal/SWNT ratio produced a decrease in the field emission performance and therefore, the preferred nanotube-ceramic composite is that one with only 10% SWNT but the maximum SWNT/metal ratio.

Although working with the nanotube-ceramic composite produced as shown herein (without purification) has an important cost advantage, other post-treatments to increase the SWNT content were explored. The post-treatment consisted in the removal of the metals by an acid attack with concentrated HCl and the partial removal of the silica support by both basic attacks with a NaOH solution and an acid attack with an HF solution.

Figure 10:
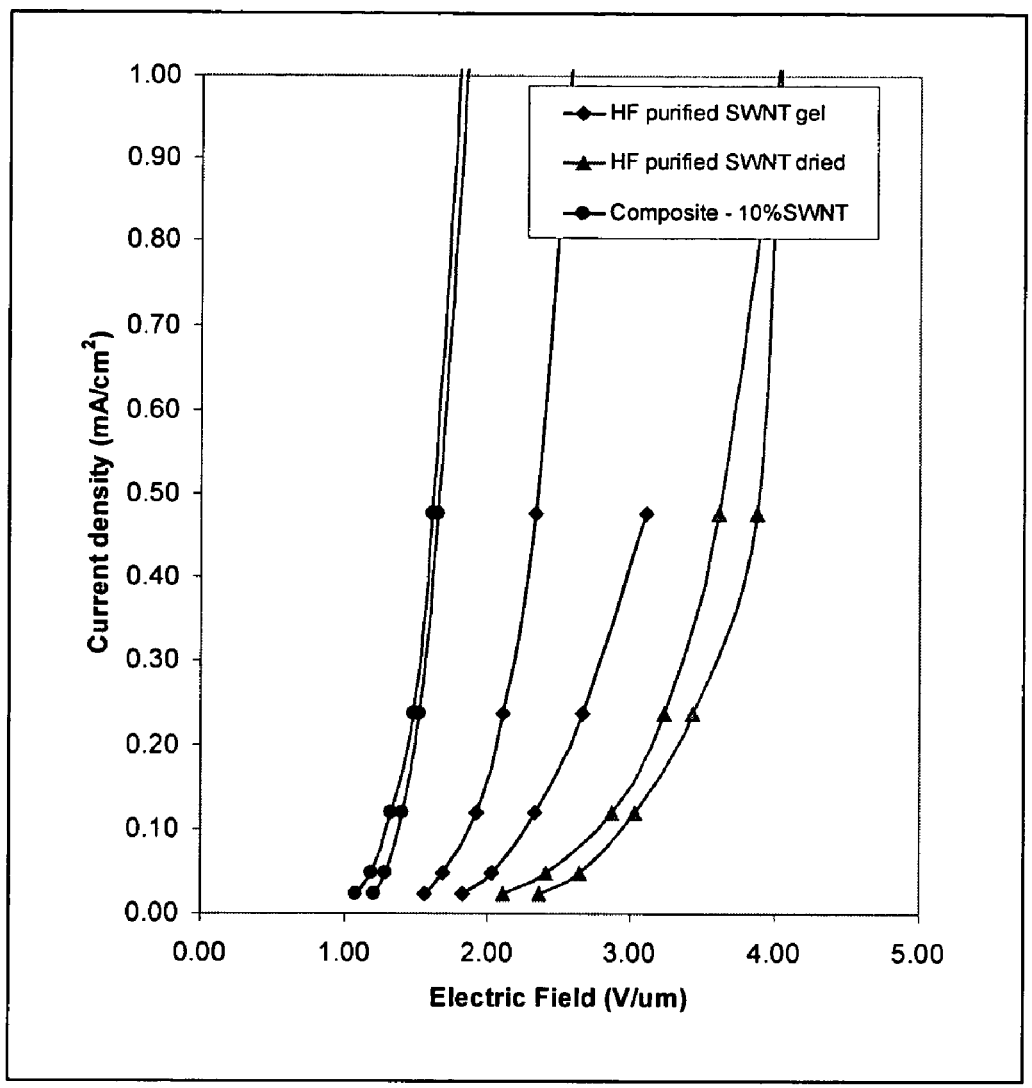
FIG. 10 is an I vs. V graph showing curves for composites and SWNTs after different purification treatments.

The NaOH treated sample increased the concentration of SWNT to 80% but resulted in a product with no field emission at all. The samples purified with HF reduced the amount of silica even more resulting in a material with only traces of silica. This material was tested in two different forms. One, in a gel form as resulted from the purification process containing mainly 1% SWNT and 99% water, and a second one in dried form that resulted from the lyophilization of the gel. FIG. 10 shows a comparison of these new samples with the nanotube-ceramic composite, in the form of I vs. V curves. Again these purification methods did not result in any improvement in the field emission of the nanotubes but it rather considerably decreased the performance of the material. Ultimately, the best field emission material has been the nanotube-ceramic composite with 10% SWNT content.

Changes may be made in the construction and the operation of the various components, elements and assemblies described herein or in the steps or the sequence of steps of the methods described herein without departing from the scope of the invention as defined in the following claims.

LITERATURE CITED

1. "Method of Producing Nanotubes" D. E. Resasco, B. Kitiyanan, J. H. Harwell, W. Alvarez. U.S. Pat. No. 6,333,016 (2001). "Method and Apparatus for Producing Nanotubes" D. E Resasco, L. Balzano, W. Alvarez, B. Kitiyanan, U.S. Pat. No. 6,413,487 (2002)
2. "Characterization of single-walled carbon nanotubes (SWNT) produced by CO disproportionation on Co—Mo catalysts" W. E. Alvarez, F. Pompeo, J. E. Herrera, L. Balzano, and D. E. Resasco. *Chemistry of Materials* 14 (2002) 1853-1858
3. "Synergism of Co and Mo in the catalytic production of single-wall carbon nanotubes by decomposition of CO" W. E. Alvarez, B. Kitiyanan, A. Borgna, and D. E. Resasco, *Carbon*, 39 (2001) 547-558
4. "Relationship Between the Structure/Composition of Co—Mo Catalysts and their Ability to Produce Single-Walled Carbon Nanotubes by CO Disproportionation"Jose E. Herrera, Leandro Balzano, Armando Borgna, Walter E. Alvarez, Daniel E. Resasco, *Journal of Catalysis* 204 (2001) 129

5. "Large screen home FEDs for advanced digital broadcasting", F. Sato and M. Seki, *Proc. of Asia Display/IDW '01*, Nagoya, Japan (2001) 1153
6. "New CNT Composites for FEDs That Do Not Require Activation" D. S. Mao, R. L. Fink, G. Monty, L. Thuesen, and Z. Yaniv, *Proc. 9th Int. Display Workshops/IDW '02*, Hiroshima, Japan (2002) 1415
7. "Transmittance and mechanical properties of PMMA-fumed silicas composites" B. Abramoff, J. Covino, *J. Appl. Poly. Sci.* 46 (1989)
8. "Study of the effect of the effect of fumed silica on rigid PVC properties" S. Fellahi, S. Boukobbal, F. Boudjenana, *J. Vinyl. Tech.* 15 (1993) 17-21
9. "Influence of fumed silica properties on the processing, curing and reinforcement properties of silicone rubber" H Cochrane, C. S. Lin, *Rubber Chem. Technol.* 66 (1993) 48-60
10. "Rheological and mechanical properties of filled rubber: silica-silicone" M. I. Aranguren, E. Mora, C. W. Macosko, J. Saam, *Rubber Chem. Technol.* 67 (1994) 820-33
11. "Compounding fumed silicas into polydimethylsiloxane: bound rubber and final aggregate size" M. I. Aranguren, E. Mora, C. W. Macosko, J. Saam, *J. Colloid Interface Sci.* 195 (1997) 329-37
12. "Effect of polymer-filler and filler-filler interactions on dynamic properties of filled vulcanizates" M. J. Wang, *Rubber Che. Technol.* 71 (1998) 520-89
13. "Dental material with inorganic filler particles coated with polymerizable binder" H. Rentsch, W. Mackert, *Eur. Pat. Appl., EP* 732099 A2 19960918 (1996)
14. "Thermal conductivity, elastic modulus, and coefficient of thermal expansion of polymer composites filled with ceramic particles for electronic packaging." C. P. Wong, Bollampally, S. Raja, *J. Appl. Polym. Sci.* 74 (1999) 3396-403
15. "Role of rheological additives in protective coatings" R. E. Van Dorem, D. N. Nash, A. Smith, *J. Protective Coatings Linings* 6 (1989) 47-52
16. "SWNT-filled thermoplastic and elastomeric composites prepared by miniemulsion polymerization" H. Barraza, F. Pompeo, E. O'Rear, D. E. Resasco, *Nano Letters* 2 (2002) 797-802
17. "Nucleation of Polypropylene Crystallization by Single-Walled Carbon Nanotubes", B. P. Grady, F. Pompeo, R. L. Shambaugh, and D. E. Resasco, *Journal of Physical Chemistry B* 106 (2002) 5852-5858
18. A. Razavi, *Chemistry* 3 (2000) 615
19. "The influence of Cr precursors in the ethylene polymerization on Cr/SiO$_2$ catalysts", A. B. Gaspar, L. C. Dieguez, *Applied Catalysis A: General* 227 (2002) 241-254
20. "Graphite Nanofibers as an Electrode for Fuel Cell Applications", Bessel, Carol A.; Laubernds, Kate; Rodriguez, Nelly M.; Baker, R. Terry K., *J. Phys. Chem. B* (2001), 105, 1089-5647
21. "Pt-WO3 supported on carbon nanotubes as possible anodes for direct methanol fuel cells", B. Rajesha, V. Karthik, S. Karthikeyan, K. Ravindranathan Thampi, J.-M. Bonard, B. Viswanathan *Fuel* 81 (2002) 2177-2190
22. "Single-wall carbon nanotube/conjugated polymer photovoltaic devices", Kymakis, E.; Amaratunga, G. A. J., *Applied Physics Letters* (2002), 80(1), 112-114
23. Ci L., Xie S., Tang D., Yan X., Li Y., Liu Z., Zou X., Zhou W., Wang G., *Chem. Phys. Lett.*, 349(3, 4) (2001) 191
24. Nikolaev P., Bronikowski M. J., Bradley R. K., Rohmund F., Colbert D. T., Smith K. A., Smalley R. E., *Chem. Phys. Lett.*, 313 (1999) 91
25. Laurence, R. L., and M. G. Chiovetta, "Heat and Mass Transfer During Olefin Polymerization from the Gas Phase," Polymer Reaction Engineering: Influence of Reaction Engineering on Polymer Properties, K. H. Reichert and W. Geisler, eds., Hanser, Munich (1983)

What is claimed is:

1. A nanotube-polymer composite comprising:
   a polymer; and
   a carbon nanotube-ceramic composite, including:
   a metallic catalytic particle, having:
   at least Co, Mo, and a support material, combined to have a particulate form; and
   a carbon product deposited on the metallic catalytic particle, at least 80% of the carbon product comprising single-walled carbon nanotubes.

2. The carbon nanotube-ceramic composite of claim 1 wherein the support material of the metallic catalytic particle is silica.

3. The carbon nanotube-ceramic composite of claim 1 wherein at least 90% of the carbon product is single-walled carbon nanotubes.

4. The carbon nanotube-ceramic composite of claim 1 wherein at least 95% of the solid carbon product is single-walled carbon nanotubes.

5. The carbon nanotube-ceramic composite of claim 1 wherein at least 50% of the single-walled carbon nanotubes have outer diameters of 0.7 nm to 1.0 nm.

6. The carbon nanotube-ceramic composite of claim 1 wherein at least 70% of the single-walled carbon nanotubes have outer diameters of 0.7 nm to 1.0 nm.

7. The carbon nanotube-ceramic composite of claim 1 wherein at least 90% of the single-walled carbon nanotubes have outer diameters of 0.7 nm to 1.0 nm.

8. The carbon nanotube-ceramic composite of claim 1 wherein at least 50% of the single-walled carbon nanotubes have outer diameters of 1.0 nm to 1.2 nm.

9. The carbon nanotube-ceramic composite of claim 1 wherein at least 70% of the single-walled carbon nanotubes have outer diameters of 1.0 nm to 1.2 nm.

10. The carbon nanotube-ceramic composite of claim 1 wherein at least 90% of the single-walled carbon nanotubes have outer diameters of 1.0 nm to 1.2 nm.

11. The carbon nanotube-ceramic composite of claim 1 wherein at least 50% of the single-walled carbon nanotubes have outer diameters of 1.2 nm to 1.8 nm.

12. The carbon nanotube-ceramic composite of claim 1 wherein at least 70% of the single-walled carbon nanotubes have outer diameters of 1.2 nm to 1.8 nm.

13. The carbon nanotube-ceramic composite of claim 1 wherein at least 90% of the single-walled carbon nanotubes have outer diameters of 1.2 nm to 1.8 nm.

14. The carbon nanotube-ceramic composite of claim 1 wherein the support material is a fumed silica.

15. A field emission material comprising the nanotube-ceramic composite of claim 1 and a binder, and wherein the field emission material can be adheringly dispersed over an electrode surface.

16. A field emission device comprising the field emission material of claim 15.

17. A carbon nanotube-ceramic composite produced by the method comprising:
   contacting, in a reactor cell, metallic catalytic particles comprising Co and Mo disposed on a support material in a ratio of one part of Co to at least two or more parts of Mo with a carbon-containing gas at a temperature sufficient to selectively produce single-walled carbon nanotubes as at least about 80% of a carbon product disposed on the metallic catalytic particles, the metallic catalytic particles and carbon product forming the carbon nanotube-ceramic composite.

18. The carbon nanotube-ceramic composite of claim 17 wherein the metallic catalytic particles further comprise a Group VIII metal selected from the group consisting of Ni, Ru, Rh, Pd, Ir, Pt, and mixtures thereof.

19. The carbon nanotube-ceramic composite of claim 17 wherein the metallic catalytic particles further comprise a Group VIb metal selected from the group consisting of Cr, W, and mixtures thereof.

20. The carbon nanotube-ceramic composite of claim 17 wherein the metallic catalytic particles further comprise a Group VIII metal selected from the group consisting of Ni, Ru, Rh, Pd, Ir, and Pt, and mixtures thereof, and a Group VIb metal selected from the group consisting of Cr, and W, and mixtures thereof.

21. The carbon nanotube-ceramic composite of claim 17 wherein the support material of the metallic catalytic particle is silica.

22. The carbon nanotube-ceramic composite of claim 17 wherein the metallic catalytic particles comprise from about 0.1% to about 20% by weight of Co and Mo.

23. The carbon nanotube-ceramic composite of claim 17 wherein the carbon-containing gas is selected from the group consisting of saturated hydrocarbons, aliphatic hydrocarbons, oxygenated hydrocarbons, aromatic hydrocarbons, alcohols, carbon monoxide, and mixtures thereof.

24. The carbon nanotube-ceramic composite of claim 17 wherein the carbon-containing gas further comprises a diluent gas.

25. The carbon nanotube-ceramic composite of claim 17 wherein the temperature sufficient to selectively produce single-walled carbon nanotubes is in the range of from about 700° C. to about 1000° C.

26. The carbon nanotube-ceramic composite of claim 17 wherein the metallic catalytic particles are substantially continuously fed into a stream of the carbon-containing gas.

27. The carbon nanotube-ceramic composite of claim 17 wherein at least about 90% of the carbon product is single-walled carbon nanotubes.

28. The carbon nanotube-ceramic composite of claim 17 wherein at least about 95% of the carbon product is single-walled carbon nanotubes.

29. The carbon nanotube-ceramic composite of claim 17 wherein the temperature sufficient to selectively produce single-walled carbon nanotubes is in a range of from about 800° C. to about 950° C.

30. The carbon nanotube-ceramic composite of claim 17 wherein the temperature sufficient to selectively produce single-walled carbon nanotubes is in a range of from about 700° C. to about 850° C.

31. A nanotube-polymer composite comprising a polymer and the carbon nanotube-ceramic composite of claim 17.

32. A field emission material comprising the nanotube-ceramic composite of claim 17 and a binder, and wherein the field emission material can be adheringly dispersed over an electrode surface.

33. A field emission device comprising the field emission material of claim 32.

34. A carbon nanotube-ceramic composite produced by the method comprising:
  contacting, in a reactor cell, metallic catalytic particles comprising Co and Mo disposed on a silica support material in a ratio of one part of Co to at least two or more parts of Mo with a carbon-containing gas at a temperature sufficient to selectively produce single-walled carbon nanotubes as at least 80% of a carbon product disposed on the metallic catalytic particles, the metallic catalytic particles and carbon product forming the carbon nanotube-ceramic composite.

35. The carbon nanotube-ceramic composite of claim 34 wherein the carbon-containing gas is selected from the group consisting of saturated hydrocarbons, aliphatic hydrocarbons, oxygenated hydrocarbons, aromatic hydrocarbons, alcohols, carbon monoxide, and mixtures thereof.

36. The carbon nanotube-ceramic composite of claim 34 wherein the metallic catalytic particles are substantially continuously fed into a stream of the carbon-containing gas.

37. The carbon nanotube-ceramic composite of claim 34 wherein the carbon-containing gas is fed into the reactor cell having the metallic catalytic particles disposed therein.

38. A nanotube-polymer composite comprising a polymer and the carbon nanotube-ceramic composite of claim 34.

39. A field emission material comprising the nanotube-ceramic composite of claim 34 and a binder, and wherein the Field emission material can be adheringly dispersed over an electrode surface.

40. A field emission device comprising the field emission material of claim 39.

41. A carbon nanotube-polymer composite comprising:
  a polymer; and
  a carbon nanotube-ceramic composite produced by the method including:
    contacting, in a reactor cell, metallic catalytic particles comprising Co and Mo disposed on a support material, with a carbon-containing gas at a temperature sufficient to catalytically produce a carbon product comprising primarily single-walled carbon nanotubes and wherein the carbon product is disposed on the metallic catalytic particles, the metallic catalytic particles and carbon product forming the carbon nanotube-ceramic composite.

42. The carbon nanotube-ceramic composite of claim 41 wherein the support material of the metallic catalytic particle is silica.

43. The carbon nanotube-ceramic composite of claim 41 wherein the carbon-containing gas is selected from the group consisting of saturated hydrocarbons, aliphatic hydrocarbons, oxygenated hydrocarbons, aromatic hydrocarbons, alcohols, carbon monoxide, and mixtures thereof.

44. The carbon nanotube-ceramic composite of claim 41 wherein the temperature sufficient to selectively produce single-walled carbon nanotubes is in the range of from about 700° C. to about 1000° C.

45. The carbon nanotube-ceramic composite of claim 41 wherein the temperature sufficient to selectively produce single-walled carbon nanotubes is in a range of from about 700° C. to about 850° C.

46. The carbon nanotube-ceramic composite of claim 41 wherein the temperature sufficient to selectively produce single-walled carbon nanotubes is in a range of from about 800° C. to about 950° C.

47. The carbon nanotube-ceramic composite of claim 41 wherein single-walled carbon nanotubes comprise at least about 60% of the carbon nanotubes in the carbon product.

48. The carbon nanotube-ceramic composite of claim 41 wherein single-walled carbon nanotubes comprise at least about 80% of the carbon nanotubes in the carbon product.

49. The carbon nanotube-ceramic composite of claim 41 wherein the metallic catalytic particles are substantially continuously fed into a stream of the carbon-containing gas.

50. The carbon nanotube-ceramic composite of claim 41 wherein the carbon-containing gas is fed into the reactor cell having the metallic catalytic particles disposed therein.

51. A field emission material comprising the nanotube-ceramic composite of claim 41 and a binder, and wherein the field emission material can be adheringly dispersed over an electrode surface.

52. A field emission device comprising the field emission material of claim 51.

53. A carbon nanotube-polymer comprising:
a polymer; and
a carbon nanotube-ceramic composite produced by the method, including:
contacting, in a reactor cell, metallic catalytic particles comprising Co and Mo disposed on a support material, with a carbon-containing gas at a temperature sufficient to catalytically produce a carbon product comprising primarily single-walled carbon nanotubes and wherein the metallic catalytic particles are substantially continuously fed into a stream of the carbon-containing gas, and wherein the carbon product is disposed on the metallic catalytic particles, the metallic catalytic particles and carbon product forming the carbon nanotube-ceramic composite.

54. The carbon nanotube-ceramic composite of claim 53 wherein the support material of the metallic catalytic particle is silica.

55. The carbon nanotube-ceramic composite of claim 53 wherein the carbon-containing gas is selected from the group consisting of saturated hydrocarbons, aliphatic hydrocarbons, oxygenated hydrocarbons, aromatic hydrocarbons, alcohols, carbon monoxide, and mixtures thereof.

56. The carbon nanotube-ceramic composite of claim 53 wherein the temperature sufficient to selectively produce single-walled carbon nanotubes is in the range of from about 700° C. to about 1000° C.

57. The carbon nanotube-ceramic composite of claim 53 wherein the temperature sufficient to selectively produce single-walled carbon nanotubes is in a range of from about 700° C. to about 850° C.

58. The carbon nanotube-ceramic composite of claim 53 wherein the temperature sufficient to selectively produce single-walled carbon nanotubes is in a range of from about 800° C. to about 950° C.

59. The carbon nanotube-ceramic composite of claim 53 wherein single-walled carbon nanotubes comprise at least about 60% of the carbon nanotubes of the carbon product.

60. The carbon nanotube-ceramic composite of claim 53 wherein single-walled carbon nanotubes comprise at least about 80% of the carbon nanotubes of the carbon product.

61. A field emission material comprising the nanotube-ceramic composite of claim 53 and a binder, and wherein the field emission material can be adheringly dispersed over an electrode surface.

62. A field emission device comprising the field emission material of claim 61.

63. A carbon nanotube-ceramic composite produced by the method, comprising:
contacting, in a reactor cell, metallic catalytic particles comprising Co and Mo disposed on a support material with a carbon-containing gas at a temperature sufficient to catalytically produce a carbon product comprising carbon nanotubes, wherein the carbon nanotubes are primarily single-walled carbon nanotubes, wherein the metallic catalytic particles are substantially continuously fed into a stream of the carbon-containing gas, and wherein the carbon product is disposed on the metallic catalytic particles, the metallic catalytic particles and carbon product forming the carbon nanotube-ceramic composite.

64. The carbon nanotube-ceramic composite of claim 63 wherein the support material of the metallic catalytic particle is silica.

65. The carbon nanotube-ceramic composite of claim 63 wherein the carbon-containing gas is selected from the group consisting of saturated hydrocarbons, aliphatic hydrocarbons, oxygenated hydrocarbons, aromatic hydrocarbons, alcohols, carbon monoxide, and mixtures thereof.

66. The carbon nanotube-ceramic composite of claim 63 wherein the temperature sufficient to selectively produce single-walled carbon nanotubes is in the range of from about 700° C. to about 850° C.

67. The carbon nanotube-ceramic composite of claim 63 wherein the temperature sufficient to selectively produce single-walled carbon nanotubes is in the range of from about 800° C. to about 950° C.

68. The carbon nanotube-ceramic composite of claim 63 wherein the temperature sufficient to selectively produce single-walled carbon nanotubes is in a range of from about 700° C. to about 1000° C.

69. The carbon nanotube-ceramic composite of claim 63 wherein single-walled carbon nanotubes comprise at least about 60% of the carbon nanotubes of the carbon product.

70. The carbon nanotube-ceramic composite of claim 63 wherein single-walled carbon nanotubes comprise at least about 80% of the carbon nanotubes of the carbon product.

71. A nanotube-polymer composite comprising a polymer and the carbon nanotube-ceramic composite of claim 63.

72. A field emission material comprising the nanotube-ceramic composite of claim 63 and a binder, and wherein the field emission material can be adheringly dispersed over an electrode surface.

73. A field emission device comprising the field emission material of claim 72.

74. A field emission material comprising:
a polymer,
a carbon nanotube-ceramic composite, including:
a metallic catalytic particle, having:
at least Co, Mo and silica, combined to have a particulate form;
a carbon product deposited on the metallic catalytic particle, at least 80% of the carbon product comprising single-walled carbon nanotubes; and
a binder, wherein the field emission material can be adheringly dispersed over an electrode surface.

75. A field emission device comprising the field emission material of claim 74.

76. A field emission material comprising:
a polymer;
a carbon nanotube-ceramic composite produced by the method comprising:
contacting, in a reactor cell, metallic catalytic particles comprising Co and Mo disposed on a support material of silica, with a carbon-containing gas at a temperature sufficient to catalytically produce a carbon product comprising primarily single-walled carbon nanotubes and wherein the carbon product is disposed on the metallic catalytic particles, the metallic catalytic particles and carbon product forming the carbon nanotube-ceramic composite; and
a binder, wherein the field emission material can be adheringly dispersed over an electrode surface.

77. A field emission device comprising the field emission material of claim 76.

78. A field emission material comprising:

a polymer;

a carbon nanotube-ceramic composite produced by the method comprising:

contacting, in a reactor cell, metallic catalytic particles comprising Co and Mo disposed on a support material of silica, with a carbon-containing gas at a temperature sufficient to catalytically produce a carbon product comprising primarily single-walled carbon nanotubes and wherein the metallic catalytic particles are substantially continuously fed into a stream of the carbon-containing gas, and wherein the carbon product is disposed on the metallic catalytic particles, the metallic catalytic particles and carbon product forming the carbon nanotube-ceramic composite; and a binder, wherein the field emission material can be adheringly dispersed over an electrode surface.

79. A field emission device comprising the field emission material of claim 78.

* * * * *